United States Patent
Dohi

(10) Patent No.: US 6,563,597 B1
(45) Date of Patent: May 13, 2003

(54) PRINTING SYSTEM AND PRINTING APPARATUS

(75) Inventor: Makoto Dohi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/228,405

(22) Filed: Jan. 12, 1999

(30) Foreign Application Priority Data

Jan. 16, 1998 (JP) ............................................ 10-018280

(51) Int. Cl.$^7$ .............................................. G06F 15/00
(52) U.S. Cl. ..................... 358/1.15; 358/1.13; 358/434; 358/435; 358/436; 358/437; 358/438; 358/439
(58) Field of Search ............................... 358/1.15, 434, 358/435, 436, 437, 438, 439

(56) References Cited

U.S. PATENT DOCUMENTS

| | | | | |
|---|---|---|---|---|
| 5,337,350 A | * | 8/1994 | Kuwahara | 358/400 |
| 5,448,378 A | * | 9/1995 | Matsumoto | 358/468 |
| 5,481,367 A | * | 1/1996 | Yokoe et al. | 358/296 |
| 5,488,454 A | * | 1/1996 | Fukada et al. | 358/1.14 |
| 5,696,606 A | * | 12/1997 | Sakayama et al. | 358/434 |
| 5,822,508 A | * | 10/1998 | Ohara | 358/1.15 |
| 6,031,637 A | * | 2/2000 | Shibata et al. | 358/440 |

* cited by examiner

Primary Examiner—Edward Coles
Assistant Examiner—Ashanti Ghee
(74) Attorney, Agent, or Firm—Fitzpatrick, Cella, Harper & Scinto

(57) ABSTRACT

A printing system has a printing apparatus and a host apparatus. Print data or control data is transferred between the printing apparatus and the host apparatus in accordance with at least two transfer methods. Upon detecting that a specific state has passed, the printing apparatus or the host apparatus predicts a change of the transfer method when (or immediately after) the specific state has passed. An analysis is conducted to determine whether the transfer method has been changed for the data subsequently transferred. If it is found that the transfer method used in the printing apparatus or the host apparatus has been changed, the other apparatus accordingly changes the transfer method. On the other hand, if the transferred data is based on the currently used method, the method is not changed, but is maintained.

13 Claims, 35 Drawing Sheets

FIRST TRANSFER METHOD

ORDER OF DATA TRANSFERRED TO PRINTING APPARATUS

SECOND TRANSFER METHOD

ORDER OF DATA TRANSFERRED TO PRINTING APPARATUS

| CONTROL DATA 1 | FIRST BYTE |
| CONTROL DATA 2 | SECOND BYTE |
| CONTROL DATA 3 (BYTES OF DATA) | THIRD BYTE |
| CONTROL DATA 4 (BYTES OF DATA) | FOURTH BYTE |
| CONTROL DATA 5 | FIFTH BYTE |
| CONTROL DATA 6 | SIXTH BYTE |

FIG. 9A

| Primary Socket ID (PSID) |
|---|
| Secondary Socket ID (SSID) |
| Length (UPPER=0x00) |
| Length (LOWER=0x10) |
| Credit |
| Control |
| a |
| b |
| c |
| d |
| e |
| f |
| g |
| h |
| i |
| j |

FIG. 9B

| |
|---|
| a |
| b |
| c |
| d |
| e |
| f |
| g |
| h |
| i |
| j |

FIG. 18

| Byte | Field | Content |
|---|---|---|
| FIRST BYTE | Primary Socket ID (PSID) | CONTENT : 0x00 |
| SECOND BYTE | Secondary Socket ID (SSID) | CONTENT : 0x00 |
| THIRD BYTE | Length (DATA SIZE, UPPER) | CONTENT : 0x0008 (2 BYTES) |
| FOURTH BYTE | Length (DATA SIZE, LOWER) | |
| FIFTH BYTE | Credit | CONTENT : 0x00~0xFF |
| SIXTH BYTE | Control | CONTENT : 0x00 |
| SEVENTH BYTE | Command | CONTENT : 0x00 |
| EIGHTH BYTE | Revision | CONTENT : 0x10 |

(First through Sixth Bytes comprise the HEADER)

FIG. 19

| | Byte | Field | Content |
|---|---|---|---|
| HEADER | FIRST BYTE | Primary Socket ID (PSID) | CONTENT : 0x00 |
| | SECOND BYTE | Secondary Socket ID (SSID) | CONTENT : 0x00 |
| | THIRD BYTE | Length (DATA SIZE, UPPER) | CONTENT : 0x0009 (2 BYTES) |
| | FOURTH BYTE | Length (DATA SIZE, LOWER) | |
| | FIFTH BYTE | Credit | CONTENT : 0x00~0xFF |
| | SIXTH BYTE | Control | CONTENT : 0x00 |
| | SEVENTH BYTE | Command | CONTENT : 0x80 |
| | EIGHTH BYTE | Result | CONTENT : 0x00 (NORMALLY) |
| | NINTH BYTE | Revision | CONTENT : 0x10 |

FIG. 22

| | | | |
|---|---|---|---|
| HEADER | FIRST BYTE | Primary Socket ID (PSID) | CONTENT : 0x00 |
| | SECOND BYTE | Secondary Socket ID (SSID) | CONTENT : 0x00 |
| | THIRD BYTE | Length (DATA SIZE, UPPER) | CONTENT : 0x0009 (Two BYTES) |
| | FOURTH BYTE | Length (DATA SIZE, LOWER) | |
| | FIFTH BYTE | Credit | CONTENT : 0x00~0xFF |
| | SIXTH BYTE | Control | CONTENT : 0x00 |
| | SEVENTH BYTE | Command | CONTENT : 0x02 |
| | EIGHTH BYTE | Primary Socket ID | CONTENT : 0x01~FF |
| | NINTH BYTE | Secondary Socket ID | CONTENT : 0x01~FF |

FIG. 23

| | Byte | Field | Content |
|---|---|---|---|
| HEADER | FIRST BYTE | Primary Socket ID (PSID) | CONTENT : 0x00 |
| | SECOND BYTE | Secondary Socket ID (SSID) | CONTENT : 0x00 |
| | THIRD BYTE | Length (DATA SIZE, UPPER) | CONTENT : 0x000A (Two BYTES) |
| | FOURTH BYTE | Length (DATA SIZE, LOWER) | |
| | FIFTH BYTE | Credit | CONTENT : 0x00~0xFF |
| | SIXTH BYTE | Control | CONTENT : 0x00 |
| | SEVENTH BYTE | Command | CONTENT : 0x82 |
| | EIGHTH BYTE | Result | CONTENT : 0x00 (NORMALLY) |
| | NINTH BYTE | Primary Socket ID | CONTENT : 0x01~FF |
| | TENTH BYTE | Secondary Socket ID | CONTENT : 0x01~FF |

FIG. 24

| Byte | Field | Content |
|---|---|---|
| FIRST BYTE | Primary Socket ID (PSID) | CONTENT : 0x00 |
| SECOND BYTE | Secondary Socket ID (SSID) | CONTENT : 0x00 |
| THIRD BYTE | Length (DATA SIZE, UPPER) | CONTENT : 0x0007 (Two BYTES) |
| FOURTH BYTE | Length (DATA SIZE, LOWER) | |
| FIFTH BYTE | Credit | CONTENT : 0x00~0xFF |
| SIXTH BYTE | Control | CONTENT : 0x00 |
| SEVENTH BYTE | Command | CONTENT : 0x08 |

(First through Sixth bytes comprise the HEADER)

FIG. 25

| | | |
|---|---|---|
| FIRST BYTE | Primary Socket ID (PSID) | CONTENT : 0x00 |
| SECOND BYTE | Secondary Socket ID (SSID) | CONTENT : 0x00 |
| THIRD BYTE | Length (DATA SIZE, UPPER) | CONTENT : 0x0008 (Two BYTES) |
| FOURTH BYTE | Length (DATA SIZE, LOWER) | |
| FIFTH BYTE | Credit | CONTENT : 0x00~0xFF |
| SIXTH BYTE | Control | CONTENT : 0x00 |
| SEVENTH BYTE | Command | CONTENT : 0x88 |
| EIGHTH BYTE | Result | CONTENT : 0x00 (NORMALLY) |

Bytes 1–6 form the HEADER.

FIG. 26

| (HOST APPARATUS) | | | (PRINTING APPARATUS) | |
|---|---|---|---|---|
| Credit FOR DATA TRANSFER CHANNEL | Credit FOR COMMAND CHANNEL | | Credit FOR COMMAND CHANNEL | Credit FOR DATA TRANSFER CHANNEL |
| 0 | 2 | | 2 | 0 |
| 0 | −1=1 | Init → | +1=3 | 0 |
| 0 | +1=2 | ← Init Reply | −1=2 | 0 |
| 0 | −1=1 | Open Channel → | +1=3 | 0 |
| +2=2 | +1=2 | ← ISSUE Two Credits BY USING PARAMETER OF Open Channel Reply | −1=2 | 0 |
| −1=2 | 2 | TRANSFER ONE Data Packet → | 2 | 0 |
| −1=0 | 2 | TRANSFER ONE Data Packet AND ISSUE ONE Credit BY USING PARAMETER → | 2 | +1=1 |
| 0 | −1=1 | Credit Request → | +1=3 | 1 |
| +1=1 | +1=2 | ← ISSUE ONE Credit BY USING PARAMETER OF Credit Request Reply | −1=2 | 1 |
| +1=2 | 2 | ← TRANSFER ONE Data Packet AND ISSUE ONE Credit BY USING PARAMETER | 2 | −1=0 |

FIG. 32

DEVICE ID DATA

MANUFACTURER : Canon ;
COMMAND SET : LIPS ;
MODEL : LaserShot730 ;
COMMENT : This is DeviceID Data ;
ACTIVE COMMAND SET : LIPS ;

FIG. 33

DEVICE ID DATA (INCLUDING SPECIFIC CHARACTER STRING)

MANUFACTURER : Canon ;
COMMAND SET : LIPS ;
MODEL : LaserShot730 ;
COMMENT : This is DeviceID Data ;
ACTIVE COMMAND SET : LIPS, Packet ON ;
　　　　　　　　　　　　　　　　(SPECIFIC CHARACTER STRING)

PRINTING SYSTEM AND PRINTING APPARATUS

BACKGROUND OF THE INVENTION

1. Field of the Invention

The present invention relates to a printing system formed of a printing apparatus and a host apparatus thereof, and also to a printing apparatus for outputting print data supplied from a host apparatus.

2. Description of the Related Art

Hitherto, in a printing system formed of a printing apparatus and a host apparatus thereof and having at least two methods for transferring print data, the following control is required when the transfer method is changed between the host apparatus and the printing apparatus. For correctly receiving data transferred from the host apparatus or the printing apparatus, almost all the transfer data is required to be analyzed in order to monitor whether the transfer method has been changed.

However, the above-described analyzing operation performed on almost all the print data results in a waste of the capacity of the printing apparatus (or the printing system), because it is irrelevant to the actual printing operation, thereby lowering the efficiency of the overall printing operation.

SUMMARY OF THE INVENTION

Accordingly, in order to solve the above problem, it is an object of the present invention to provide a printing system and a printing apparatus in which the efficiency of the overall printing operation can be enhanced by simplifying the processing for monitoring the change of the transfer methods.

In order to achieve the above object, according to one aspect of the present invention, there is provided a printing system including a printing apparatus and a host apparatus of the printing apparatus. In the printing system, print data or control data is transferred between the printing apparatus and the host apparatus in accordance with at least two transfer methods. The printing system includes prediction means for predicting a change of the transfer method immediately after a specific state has passed. Control means controls the host apparatus or the printing apparatus to change the transfer method when the other apparatus changes the transfer method based on a result predicted by the prediction means.

In the aforementioned printing system, upon receiving a device identification request defined in IEEE1284-1994 from the host apparatus, the prediction means may predict a change of the transfer method, and the control means may cause the transfer method to become ready for a change immediately after the device identification request has been received.

In the aforementioned printing system, upon starting or completing the transferring of device identification data to the host apparatus in response to a device identification request defined in IEEE1284-1994 from the host apparatus, the prediction means may predict a change of the transfer method, and the control means may cause the transfer method to become ready for a change immediately after said printing apparatus starts or finishes transferring the device identification data to said host apparatus.

In the above case, the control means may cause the transfer method to become ready for a change upon completing the transferring of the device identification data to the host apparatus if specific data is contained in the device identification data.

In the aforementioned printing system, upon issuing an initializing signal on an interface in accordance with an instruction from the host apparatus, the prediction means may predict a change of the transfer method, and the control means may cause the transfer method to become ready for a change immediately after executing processing for the initializing signal.

In the aforementioned printing system, upon initializing the printing apparatus in accordance with an instruction from operation means of the printing apparatus, the prediction means may predict a change of the transfer method, and the control means may cause the transfer method to become ready for a change immediately after the printing apparatus has been initialized.

In the aforementioned printing system, upon resupplying power to the printing system, the prediction means may predict a change of the transfer method, and the control means may cause the transfer method to become ready for a change upon completion of the resupply of power.

In the aforementioned printing system, upon receiving an instruction from operation means of the printing apparatus or the host apparatus, the prediction means may predict a change of the transfer method, and the control means may cause the transfer method to become ready for a change immediately after the operation means has been operated.

In the aforementioned printing system, upon transferring a specific command from the host apparatus or the printing apparatus and analyzing the specific command by the host apparatus or the printing apparatus, the prediction means may predict of a change of the transfer method, and the control means may cause the transfer method to become ready for a change immediately after the specific command has been analyzed.

In the above case, an analysis of data transferred from the host apparatus or the printing apparatus continues until a predetermined amount of data has been received after the transfer method has become ready for a change. In this case, the predetermined amount of data to be analyzed may be preset by operation means. Alternatively, the predetermined amount of data to be analyzed may be preset by a command pretransmitted from the host apparatus or the printing apparatus.

In the aforementioned printing system, the currently used transfer method may not be changed, but may be maintained, if the print data or the control data is transferred from the host apparatus or the printing apparatus in accordance with the currently used transfer method even if the transfer method becomes ready for a change.

In the aforementioned printing system, the currently used transfer method may not be changed, but may be maintained, if a determination of whether the transfer method has been changed has not been made for a predetermined period because there is only a small amount of print data or control data transferred from the host apparatus or the printing apparatus after the transfer method has become ready for a change. In this case, the predetermined period may be preset by operation means, or may be preset by a command pretransmitted from the host apparatus or the printing apparatus.

According to another aspect of the present invention, there is provided a printing apparatus for transferring print data or control data to a host apparatus in accordance with at least two transfer methods, and for outputting the print data supplied from the host apparatus. The printing apparatus includes prediction means for predicting a change of the transfer method immediately after a specific state has passed. Control means causes the transfer method to become ready for a change based on a result predicted by the prediction means.

In the aforementioned printing apparatus, upon receiving a device identification request defined in IEEE1284-1994 from the host apparatus, the prediction means may predict a change of the transfer method, and the control means may cause the transfer method to become ready for a change immediately after the device identification request has been received.

In the aforementioned printing apparatus, upon starting or completing the transferring of device identification data to the host apparatus in response to a device identification request defined in IEEE1284-1994 from the host apparatus, the prediction means may predict a change of the transfer method, and the control means may cause the transfer method to become ready for a change immediately after starting or finishing transferring the device identification data to the host apparatus.

In the above case, the control means may cause the transfer method to become ready for a change upon completing the transferring of the device identification data to the host apparatus if specific data is contained in the device identification data.

In the aforementioned printing apparatus, upon issuing an initializing signal on an interface in accordance with an instruction from the host apparatus, the prediction means may predict a change of the transfer method, and the control means may cause the transfer method to become ready for a change immediately after executing processing for the initializing signal.

The aforementioned printing apparatus may further include operation means for performing an operation for printing. Upon initializing the printing apparatus in accordance with an instruction from the operation means, the prediction means may predict a change of the transfer method, and the control means may cause the transfer method to become ready for a change immediately after the printing apparatus has been initialized.

In the aforementioned printing apparatus, upon resupplying power to the printing apparatus, the prediction means may predict a change of the transfer method, and the control means may cause the transfer method to become ready for a change upon completion of the resupply of power.

The aforementioned printing apparatus may further include operation means for performing an operation for printing. Upon receiving an instruction from the operation means, the prediction means may predict a change of the transfer method, and the control means may cause the transfer method to become ready for a change immediately after the operation means has been operated.

In the aforementioned printing apparatus, upon transferring a specific command from the host apparatus and analyzing the specific command, the prediction means may predict a change of the transfer method, and the control means may cause the transfer method to become ready for a change immediately after the specific command has been analyzed.

In the above case, an analysis of data transferred from the host apparatus may continue until a predetermined amount of data has been received after the transfer method has become ready for a change. In this case, the printing apparatus may further include operation means for performing an operation for printing. The predetermined amount of data to be analyzed may be preset by the operation means, or may be preset by a command pretransmitted from the host apparatus.

In the aforementioned printing apparatus, the currently used transfer method may not be changed, but may be maintained, if the print data or the control data is transferred from the host apparatus in accordance with the currently used transfer method even if the transfer method becomes ready for a change.

In the aforementioned printing apparatus, the currently used transfer method may not be changed, but may be maintained, if a determination of whether the transfer method has been changed has not been made for a predetermined period because there is only a small amount of print data or control data transferred from the host apparatus after the transfer method has become ready for a change.

In the above case, the printing apparatus may further include operation means for performing an operation for printing. The predetermined period may be preset by the operation means, or may be preset by a command pretransmitted from the host apparatus.

Further objects, features and advantages of the present invention will become apparent from the following description of the preferred embodiments with reference to the attached drawings.

BRIEF DESCRIPTION OF THE DRAWINGS

FIGS. 9A and 9B respectively illustrate data which is formed into a packet based on IEEE1284.4 and data which is not formed into a packet based on IEEE1284.4;

FIG. 18 illustrates the basic structure of a packet used under the control of IEEE1284.4;

FIG. 19 illustrates the basic structure of a packet used under the control of IEEE1284.4;

FIG. 22 illustrates the basic structure of a packet used under the control of IEEE1284.4;

FIG. 23 illustrates the basic structure of a packet used under the control of IEEE1284.4;

FIG. 24 illustrates the basic structure of a packet used under the control of IEEE1284.4;

FIG. 25 illustrates the basic structure of a packet used under the control of IEEE1284.4;

FIG. 26 illustrates the transition of the credit status used in the flow control of IEEE1284.4;

FIG. 32 illustrates an example of device ID data (character string);

FIG. 33 illustrates an example of device ID data (including a specific character string);

DESCRIPTION OF THE PREFERRED EMBODIMENTS

Preferred embodiments of the present invention are described below with reference to the drawings.

First Embodiment

Figure 1:
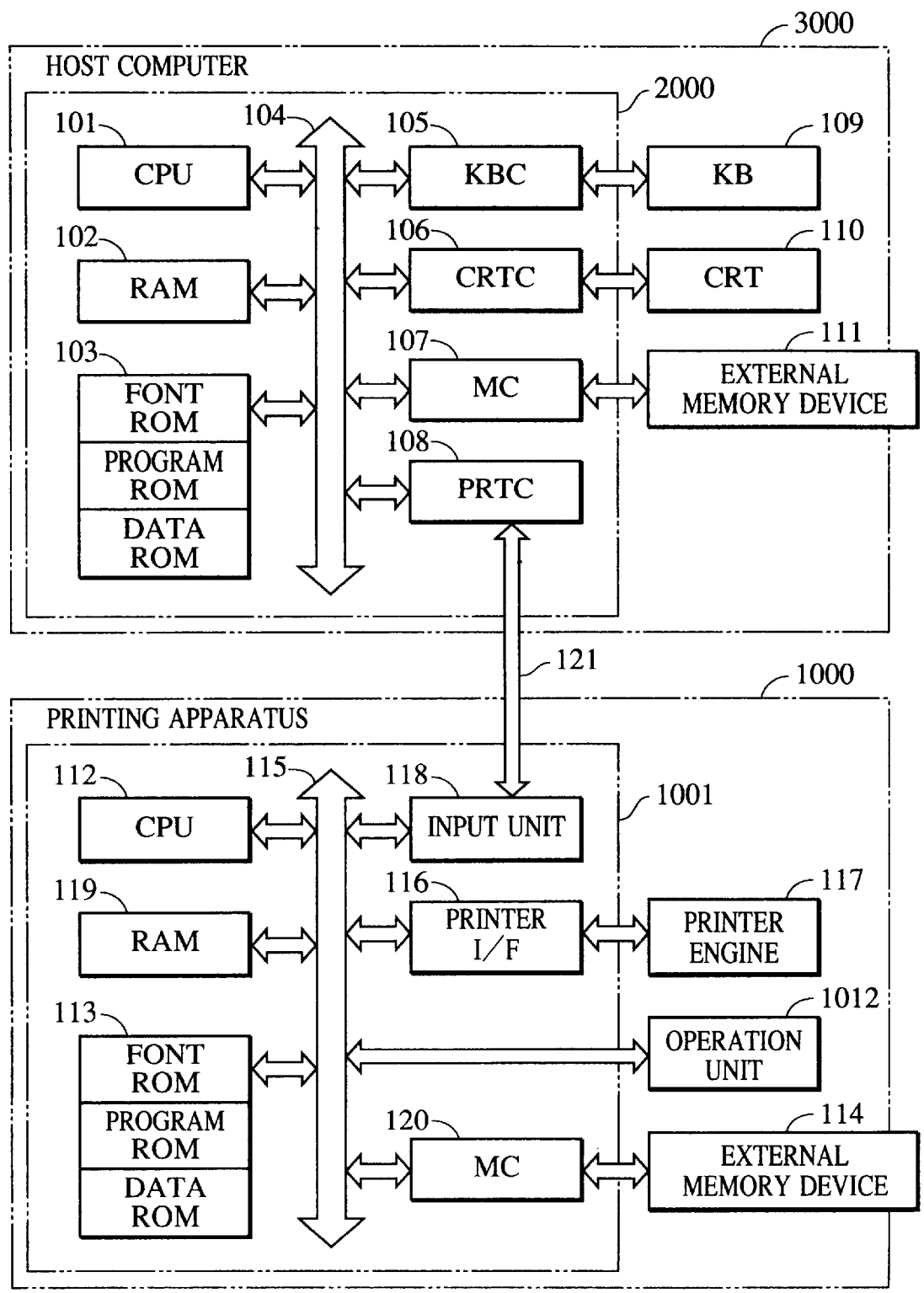
FIG. 1 is a block diagram illustrating the schematic configuration of a printing system according to a first embodiment of the present invention.
Figure 2:
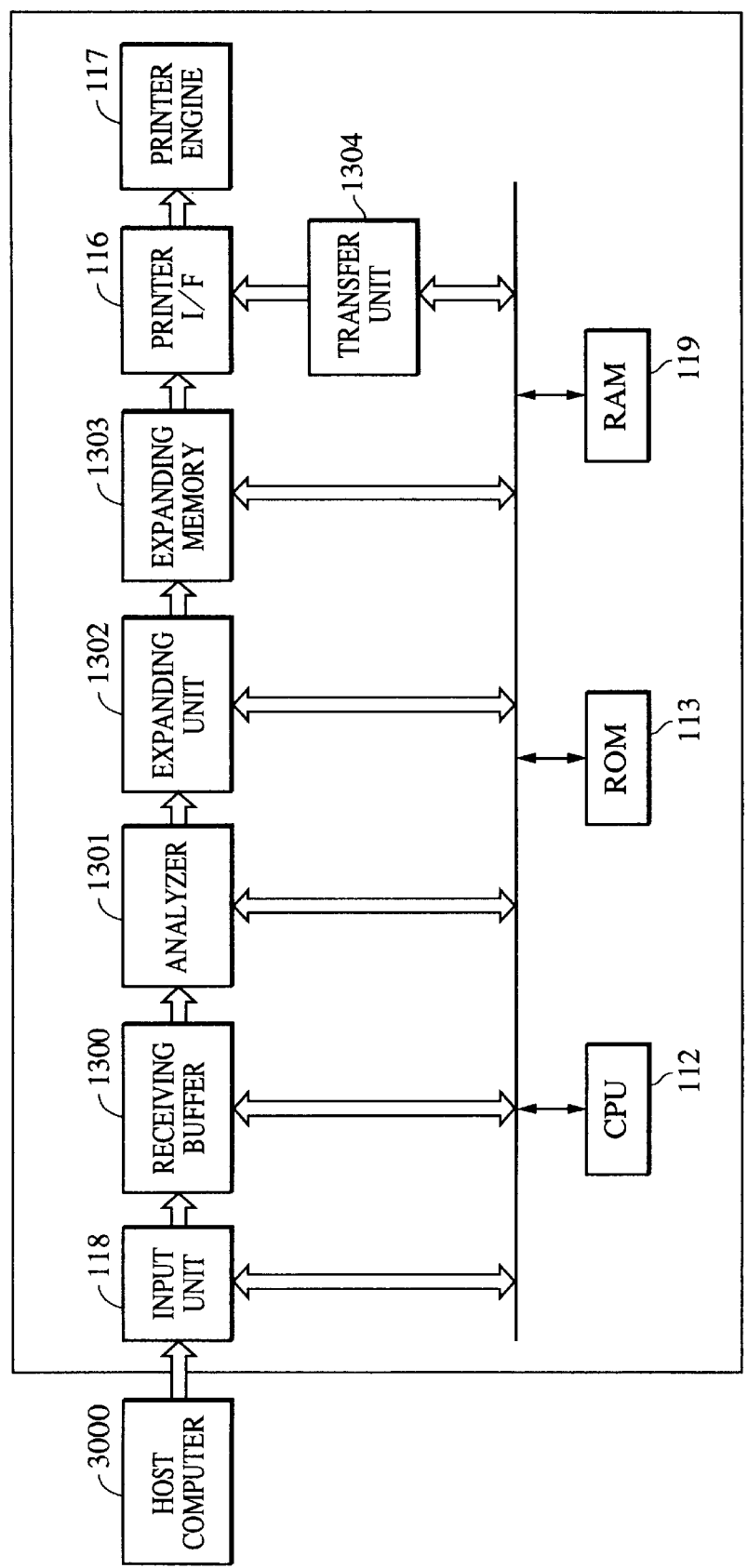
FIG. 2 is a block diagram illustrating the internal configuration of a printing apparatus as viewed in terms of the flow of print data.
Figure 3:
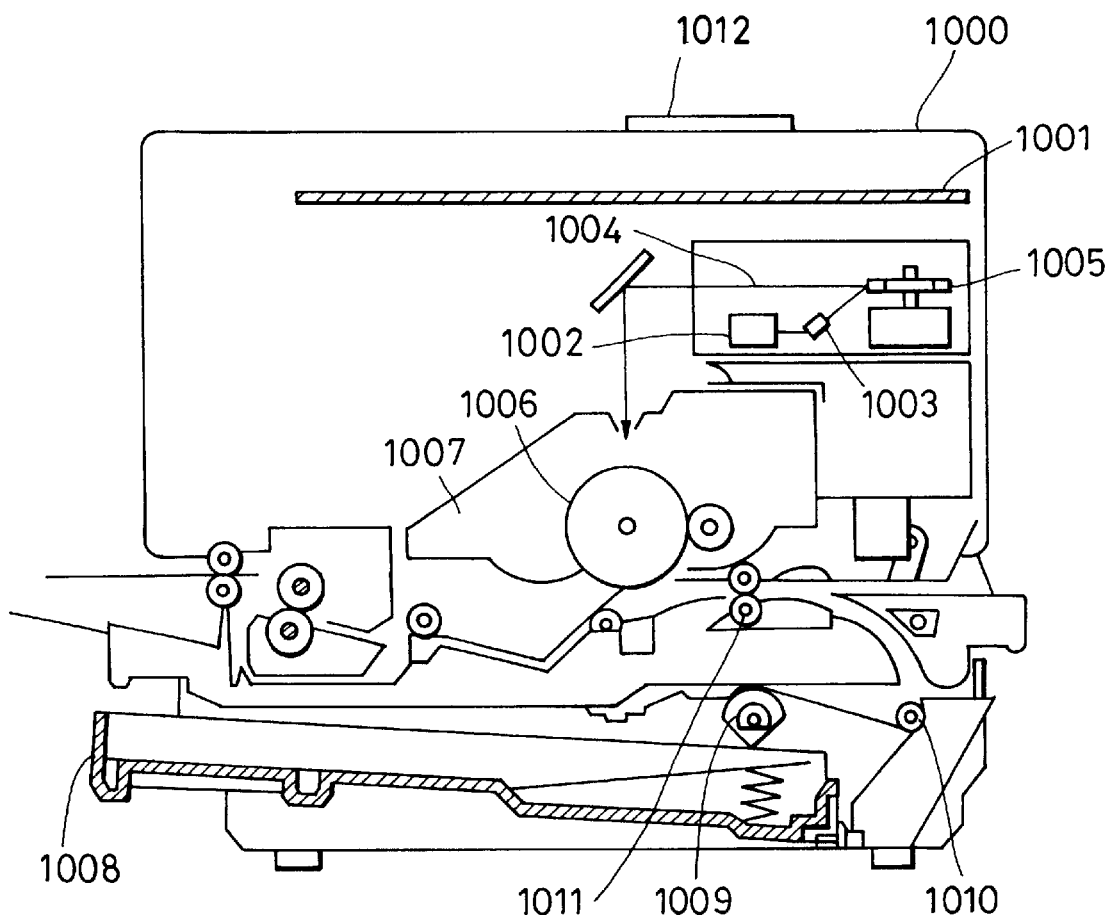
FIG. 3 is a sectional view illustrating the internal configuration of a laser beam printer (LBP) for use in the first embodiment of the present invention.

FIG. 1 is a block diagram illustrating the schematic configuration of a printing system according to a first embodiment of the present invention. FIG. 2 is a block diagram illustrating the internal configuration of a printing apparatus, as viewed in terms of the flow of print data. FIG. 3 is a sectional view illustrating the internal configuration of a laser beam printer (hereinafter referred to as an "LBP") incorporating the first embodiment of the present invention.

Configuration of LBP

The configuration of an LBP suitably used as this embodiment is now discussed below with reference to FIG. 3. The printer used as this embodiment is not limited to the LBP, and may be a printer (printing apparatus) utilizing another printing method.

In this LBP, character patterns and standard formats (form data) can be registered from a data source (not shown). In FIG. 3, a printing apparatus, i.e., an LBP, 1000 receives and stores character information (character codes), form information, and macro instructions supplied from a host apparatus (such as-a host computer) connected to an exterior source, and also creates character patterns and form patterns corresponding to the above information, thereby forming images on a recording medium, such as recording paper.

The LBP 1000 also includes an operation unit 1012 having switches and an LED display, and a printer control unit 1001 for controlling the entire LBP 1000 and for analyzing character information supplied from the host computer. The printer control unit 1001 converts mainly character information into a video signal representing the corresponding character pattern, and outputs the video signal to a laser driver 1002. The laser driver 1002 is a circuit for driving a semiconductor laser 1003, and switches the on/off operation of a laser beam 1004 emitted from the semiconductor laser 1003 in accordance with the input video signal.

The laser beam 1004 is horizontally deflected by a rotating polygonal mirror 1005 so as to scan on an electrostatic drum 1006, thereby forming an electrostatic latent image on the drum 1006. The latent image is developed by a developer unit 1007 disposed around the electrostatic drum 1006 and is then transferred to recording paper, i.e., a sheet of paper. The sheet of paper, which has been accommodated in a paper cassette 1008 attached to the LBP 1000, is fed to the LBP 1000 through a paper-feeding roller 1009 and feeding rollers 1010 and 1011, and is then supplied to the electrostatic drum 1006.

Configurations of Printing Apparatus and Host Apparatus

A description is now given with reference to FIG. 1 of the configurations of the printing apparatus and the host apparatus according to the first embodiment of the present invention.

It is now assumed that the LBP shown in FIG. 3 is used as the printing apparatus in this embodiment. It should be noted, however, that the present invention is applicable to a single apparatus, a system formed of a plurality of apparatuses, or a system performing processing via a network, such as a local area network (LAN).

In FIG. 1, reference numeral 3000 indicates a host apparatus, such as a host computer, which has a central processing unit (CPU) 101 for processing a document represented by a mixture of graphics, images, characters, and tables (including spreadsheets), according to a document processing program stored in a program read only memory (ROM) of a ROM 103. The CPU 101 entirely controls the respective devices connected to a system bus 104. The individual functions of the ROM 103 are as follows. The program ROM stores a control program of the CPU 101, a font ROM stores font data used in the above-mentioned document processing, and a data ROM stores various types of data used in executing the document processing.

A random access memory (RAM) 102 serves as a main memory, a work area, etc., for the CPU 101. A keyboard controller (KBC) 105 controls the key input of a keyboard 109 or a pointing device (not shown). A cathode ray tube controller (CRTC) 106 controls the display of a CRT display (CRT) 110. A memory controller (MC) 107 controls access to/from an external memory device 111, such as a floppy disk (FD) or a hard disk (HD) for storing a boot program, various application programs, font data, a user file, an editing file, etc.

A printer controller (PRTC) 108 is connected to the LBP 1000 via a predetermined two-way interface 121 so that it controls communications with the LBP 1000. The CPU 101 rasterizes an outline font onto, for example, a display information RAM set on the RAM 102, thereby achieving "what-you-see-is-what-you-get" (WYSIWYG) on the CRT 110. The CPU 101 also opens various windows registered based on commands by using a mouse cursor (not shown) on the CRT 110, thereby executing various data processing.

In the LBP 1000, a printer CPU 112 entirely controls access to/from the individual devices connected to a system bus 115, based on a control program stored in a program ROM of a ROM 113 or a control program stored in an external memory device 114, and then outputs an image signal as output information to a print portion (engine) 117 connected to a printer interface (I/F) 116. The CPU 112 also has a built-in (or external) time management function, such as a timer. The program ROM of the ROM 113 may store a control program for the CPU 112, which is indicated by the flow chart (described later) of the embodiment.

The individual functions of the ROM 113 are as follows. A font ROM stores font data used in generating the above-described output information. A data ROM stores information used by the host apparatus 3000 if the printer is not provided with the external memory device 114, such as a hard disk. The CPU 112 is able to communicate with the host apparatus 3000 via an input unit 118 so that it can notify the host apparatus 3000 of the information within the LBP 1000.

A RAM 119, which functions as a main memory, a work area, etc. for the CPU 112, is able to expand the memory capacity by using an option RAM connected to an expansion port (not shown). The RAM 119 is used as an output-information expanding area, an environment-data storage area, and a non-volatile RAM (NVRAM). The access to/from the above-described external memory device 14, such as a hard disk (HD) or an integrated circuit (IC) card, is controlled by a memory controller (MC) 120. The external memory device 114 is optionally connected, and stores font data, an emulation program, form data, etc.

The input unit 118 is provided with switches and an LED display used for the above-described operation unit 1012. The number of aforementioned external memory devices 114 is not restricted to one, but a plurality of external memory devices 114 may be provided, for example, a plurality of external memory devices 114 storing not only a built-in font, but also an option font card, and a program interpreting different printer control languages may be connected. The external memory device 114 may be provided with an NVRAM (not shown) to store printer-mode setting information from the operation unit 1012.

Internal Configuration of Printing Apparatus

A description is now given below with reference to FIG. 2 of the configuration of the printing apparatus (LBP) 1000 as viewed in terms of the flow of print data according to the first embodiment of the present invention.

Print data transferred from the host apparatus 3000 is stored in a receiving buffer 1300 via the input unit 118. The print data is further supplied to an analyzer 1301, and is analyzed. The analyzed data is then transferred to an expanding unit 1302. Upon Completion of expanding the print data onto an expanding memory 1303 by the expanding unit 1302, a transfer unit 1304 transfers the data to the print engine 117 via the printer I/F 116 and is recorded on a recording medium. The expanding memory 1303 may be part of the RAM 119.

Two Types of Transfer Methods

The two types of transfer methods for transferring print (control) data for use in this embodiment are now discussed with reference to FIGS. 4A, 4B, and 4C.

Figure 4A:
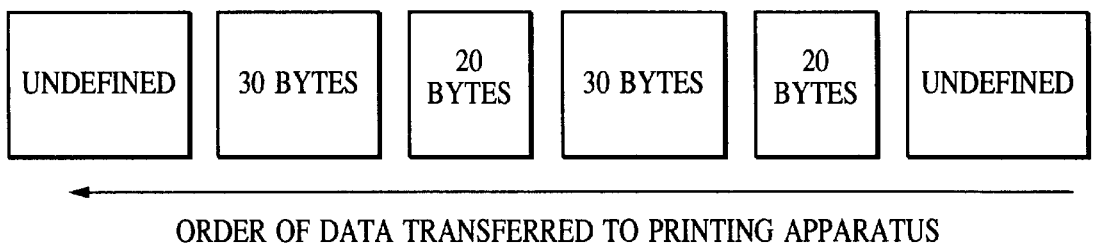
FIGS. 4A and 4B respectively illustrate first and second transfer methods of print (control) data.

According to a first transfer method shown in FIG. 4A, there are no limitations imposed on the cohesion (continuity) of print (control) data. For example, if there is print (control) data having a total size of 100 bytes, the host apparatus neither reveals to the printing apparatus that the data has a total size of 100 bytes nor does it reveal when and how many bytes of data will be transferred to the printing apparatus.

Figure 4B:
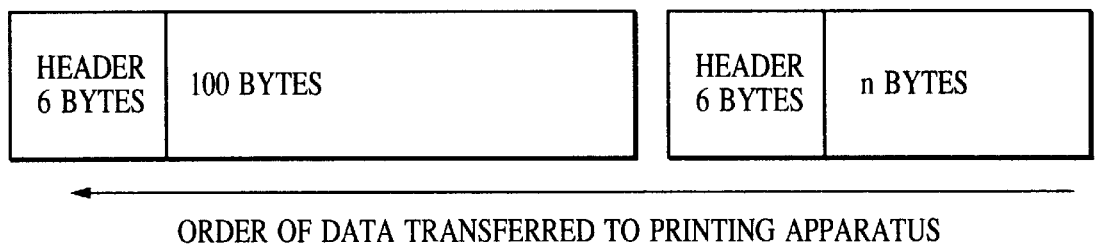
Figure 4C:
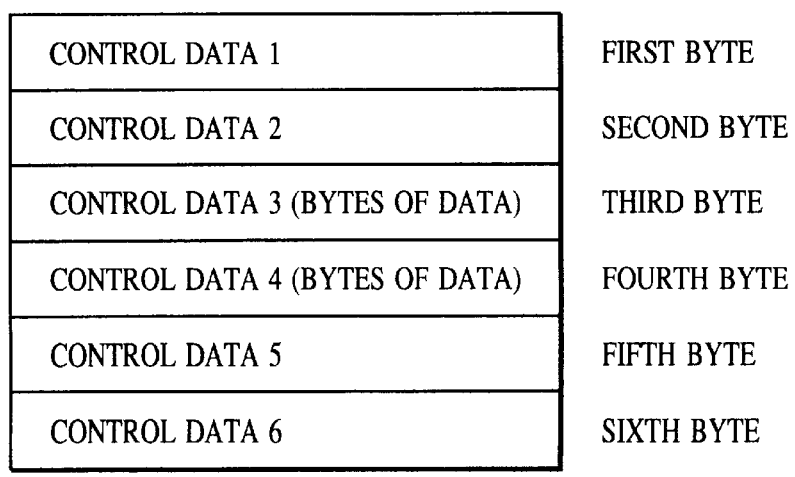
FIG. 4C illustrates the content of a header used in the second transfer method shown in FIG. 4B.

According to a second transfer method shown in FIG. 4B, print (control) data is transferred in the form of a block having a plurality of bytes. In addition to the actually required print data, the data for managing a block of print (control) data, which is referred to as a "header", is provided. The header contains information, which serves as forming the print data into a block having a plurality of bytes. With this arrangement, the data is reliably transferred from the host apparatus to the printing apparatus in the order of the header and the print (control) data. The above-mentioned header and the print data are referred to as a "packet".

For example, if there is print (control) data having a total amount of 100 bytes, the header contains information indicating that 100-byte data will be transferred. Accordingly, upon receiving the header, the printing apparatus recognizes that the 100-byte print data will be transferred. In this example, the total size of the packet is equal to the number of bytes of the header and 100 bytes.

For convenience, in this embodiment, the size of the header is fixed to be six bytes. The content of the header is shown in FIG. 6C. In the header used in this embodiment, the first, second, fifth, and sixth byte data contain control data employed according to the packet transfer method, while the third and fourth byte data contain the bytes of data to be transferred after the header. The bytes of data may include six bytes of the packet, but varies according to the individual packet method.

The portions through which data are transferred according to the aforementioned two transfer methods, i.e., the interface 121, the printer controller (PRTC) 108, and the input unit 118 shown in FIG. 1 may be formed based on the following two techniques, i.e., the Centronics interface (IEEE1284) or IEEE1284.4. The outlines of the respective techniques are thus discussed below.

Outline of Centronics Interface

The Centronics interface, which is one of the major interfaces for transferring data from a host computer to a printer, is a specification developed by Centronics Corporation in the United States for transferring data from a computer to a printer. Since data can be transferred efficiently and quickly, the Centronics interface finds widespread use as a data transfer medium from personal computers (PCs) to a printer, but it is not standardized. Although there are numerous and different variations in the transfer control method according to the individual host computers and the printers, they are basically all similar. Three signal lines (DATA STROBE, ACK, BUSY) are employed to perform basic control. The transfer control method employed in this embodiment is referred to as a "compatibility mode" as opposed to a nibble mode, a byte mode, and an extended capabilities port (ECP) mode, all of which will be described later.

A detailed explanation of the compatibility mode is as follows. As noted above, since there are many variations in the transfer control method according to the host computers and the printers for use, LBP-730 made by Canon Corporation will be taken as an example as a printer.

Figure 5:
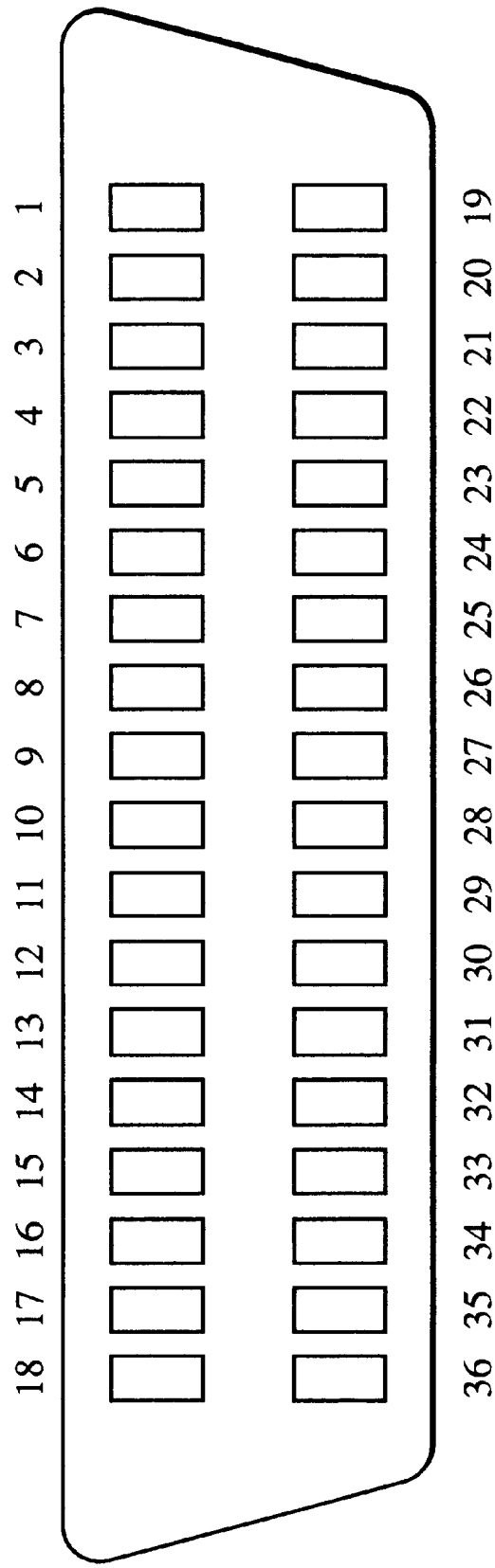
FIG. 5 illustrates the pin arrangement of a connector used in the Centronics interface.

As indicated by the pin arrangement of a connector used in the Centronics interface in FIG. 5, 36 pins are arranged. The numbers shown in FIG. 5 indicate the pin numbers. Each pin corresponds to one signal line, for example, the pin having number 1 (simply referred to as "pin1"), corresponds to a signal line DATA STROBE, which is more specifically described below.

Pin1 (DATA STROBE) is at a high level (hereinafter simply referred to as "HIGH") in a normal condition, and when it is changed to a low level (hereinafter simply referred to as "LOW"), the printer reads the states of DATA1 through DATA8.

Pin2 through pin9 (DATA1 through DATA8) respectively represent information from the 0th bit through the seventh bit of data transferred from the host computer. When pin2 through pin9 are HIGH, data is 1, and when they are LOW, data is 0. Pin2 through pin9 are undefined in a normal condition, and are valid only when DATA STROBE is LOW.

Pin10 (ACK) is HIGH in a normal condition, and emits a LOW pulse when one byte has been received and is ready to receive a subsequent byte, or when the printer has shifted from the off-line state to the on-line state with a free space of the receiving buffer 1300.

Pin11 (BUSY) represents whether the printer is able to receive data from the host computer. When pin11 is LOW, the printer is able to receive the data, and when pin11 is HIGH, the printer is unable to receive the data. Pin11 is changed to HIGH under one of the following conditions: the printer is in the off-line state, an error has occurred, the printer has received one byte and is not ready to receive a subsequent byte, and there is no free space in the receiving buffer 1300.

Pin12 (PE) is HIGH when an error has occurred in the printer, and is LOW when the printer is in the other states. Pin13 (SELECT) is HIGH when the printer is in the on-line state, and is LOW when the printer is in the other states.

Pin14 (AUTO FD) is unused, pin15 (AUX OUT1) is always HIGH. Pin16 (0V) is at the ground level of the printer, and pin17 (Frame GND) is at the frame ground of the printer. Pin18 (+5V) is always HIGH, and pin19 through pin30 (GND) are grounded.

Pin31 (INIT) is normally maintained at HIGH, but is shifted to LOW, thereby performing input-prime processing. Pin32 (FAULT) is HIGH when the printer is in the on-line state, and is LOW when the printer is in the other states.

Pin33 (AUX OUT2) and pin34 (AUX OUT3) are constantly LOW, and pin35 (AUX OUT4) is invariably HIGH. Pin36 (SELECT IN) is unused.

Figure 6:
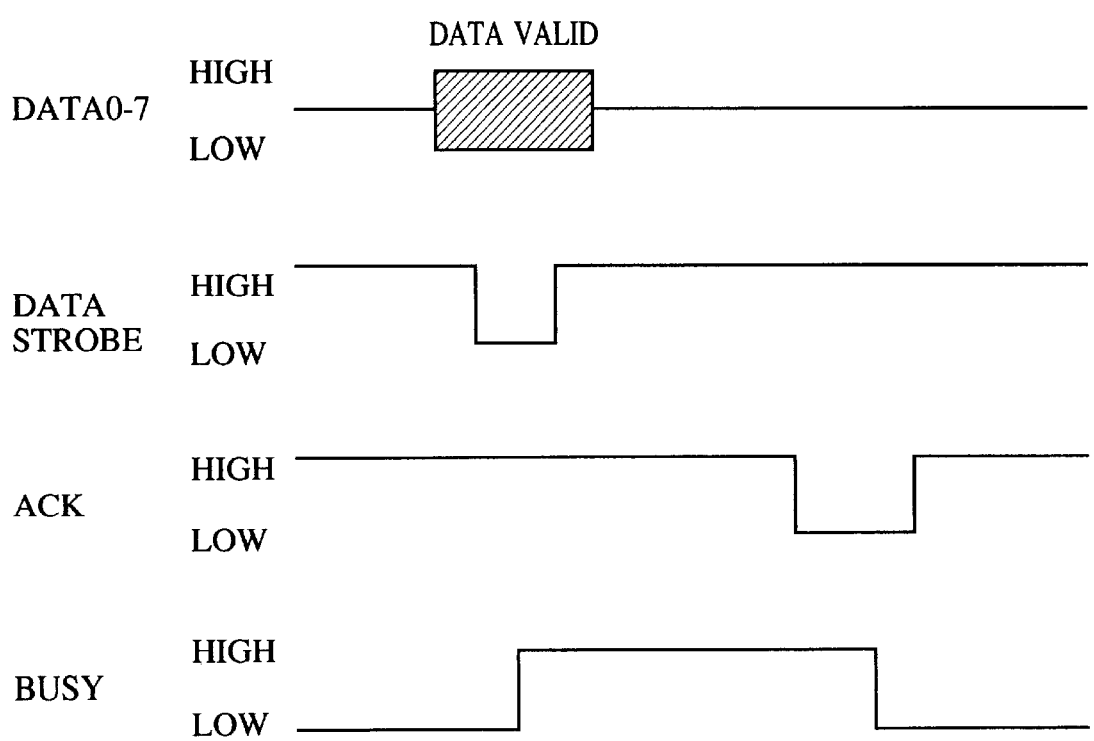
FIG. 6 illustrates a handshake established in the compatibility mode.

The pins primarily used in the compatibility mode are pin1 through pin11, i.e., DATA STROBE, DATA1, DATA2, DATA3, DATA4, DATA5, DATA6, DATA7, DATA8, ACK, and BUSY signal lines. A handshake established in the compatibility mode is shown in FIG. 6. In this example, one-byte data is transferred.

Outline of IEEE1284

In the aforementioned compatibility mode, only one-way communication is implemented, i.e., data is transferred only from a host computer to a printer, but not vice versa. To overcome the above drawback, as an upper compatibility of the compatibility mode, a Centronics two-way communication handshake is standardized by the IEEE (IEEE1284-1994).

In the IEEE1284-1994, in addition to the aforementioned compatibility mode (a conventionally used handshake for transferring a host computer to a printer), a plurality of communication modes, such as a nibble mode, a byte mode, and an ECP mode, are specified. Connectors and cables having the same configurations as those used in the compatibility mode can be used in the newly added modes.

The nibble mode is a mode for transferring data from a printer to a host computer, and can be alternately used in combination with the compatibility mode, thereby achieving two-way communications between the host computer and the printer. That is, the compatibility mode is used for transferring data from the host computer to the printer, while the nibble mode is used for transferring data from the printer to the host computer.

In the nibble mode, the signal lines ACK and AUTO FD are employed to perform transfer control, and data is set in the four signal lines BUSY, PE, SELECT, and FAULT. One byte (consisting of eight bits) of data is first divided into two portions, each having four bits. The lower four bits are first transmitted, and then, the upper four bits are transmitted, thereby transferring the whole eight bits (one byte). The signal line FAULT is also used at a specific timing, i.e., when the printer indicates whether data is ready to be transmitted to the host computer.

A handshake is established without using the signal lines DATA1, DATA2, ..., DATA8, which are controlled only by the host computer in the compatibility mode, DATA1, DATA2, ..., DATA8 being referred to as a "data bus". In the nibble mode, since the data bus is not employed, it is unnecessary to consider the compatibility with hardware of the host computer. Thus, the implementation can be performed relatively easily. The byte mode, as well as the nibble mode, is a mode for transferring data from the printer to the host computer, and can be alternately employed in combination with the compatibility mode, thereby achieving two-way communications between the host computer and the printer. Namely, the compatibility mode is used for transferring data from the host computer to the printer, while the byte mode is used for transferring data from the printer to the host computer.

In the byte mode, the signal lines STROBE, ACK, BUSY, PE, AUTO FD, and FAULT are used to perform transfer control, and data is set in the data bus (DATA1, DATA2, ..., DATA8). In the byte mode, data transfer is more efficient than in the nibble mode, since one byte (eight bits) can be simultaneously transferred. However, since the data bus is controlled by the printer, it is necessary to consider the compatibility with hardware of the host computer.

The ECP mode is a mode for performing communications from the host computer to the printer and vice versa. Internally, the forward phase (from the host computer to the printer) mode and the reverse phase (from the printer to the host computer) mode can be switched to enable two-way data transfer by using the single ECP mode.

In the ECP mode, the signal lines STROBE, ACK, BUSY, AUTO FD, INIT, FAULT, and PE are employed to perform transfer control, and data is set in the data bus. The data bus is controlled by the printer, and the compatibility with hardware of the host computer should be considered. Since two-way data transfer can be achieved by using the same mode, overhead processing required for shifting between two modes can be reduced, and the transfer rate in a handshake established in the ECP forward phase mode is higher than that in the compatibility mode.

Outline of IEEE1284.4

IEEE1284.4 is an improved version of the aforementioned IEEE1284 and provides the following two major functions. A flow control employing the concept of "credit" is performed between two apparatuses (for example, a host apparatus and a printing apparatus) according to the data transfer using the above-described IEEE1284 (or another interface). Multiplexing (multi-channeling) is performed to simultaneously transfer a plurality of information (for example, data and control information).

Figure 7:
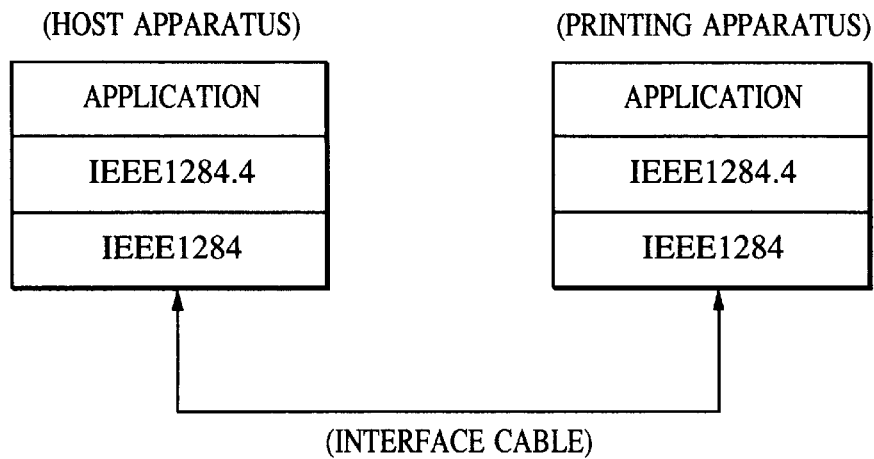
FIG. 7 schematically illustrates the relationship of IEEE1284.4 to an application and IEEE1284.

In terms of the processing internally executed by the host apparatus and the printing apparatus, the control using IEEE1284.4 is positioned between the processing for printing transfer data (generally referred to as an "application") and the actual data transfer portion, i.e., IEEE1284. The concept representing the above relationship is shown in FIG. 7.

Figure 8:
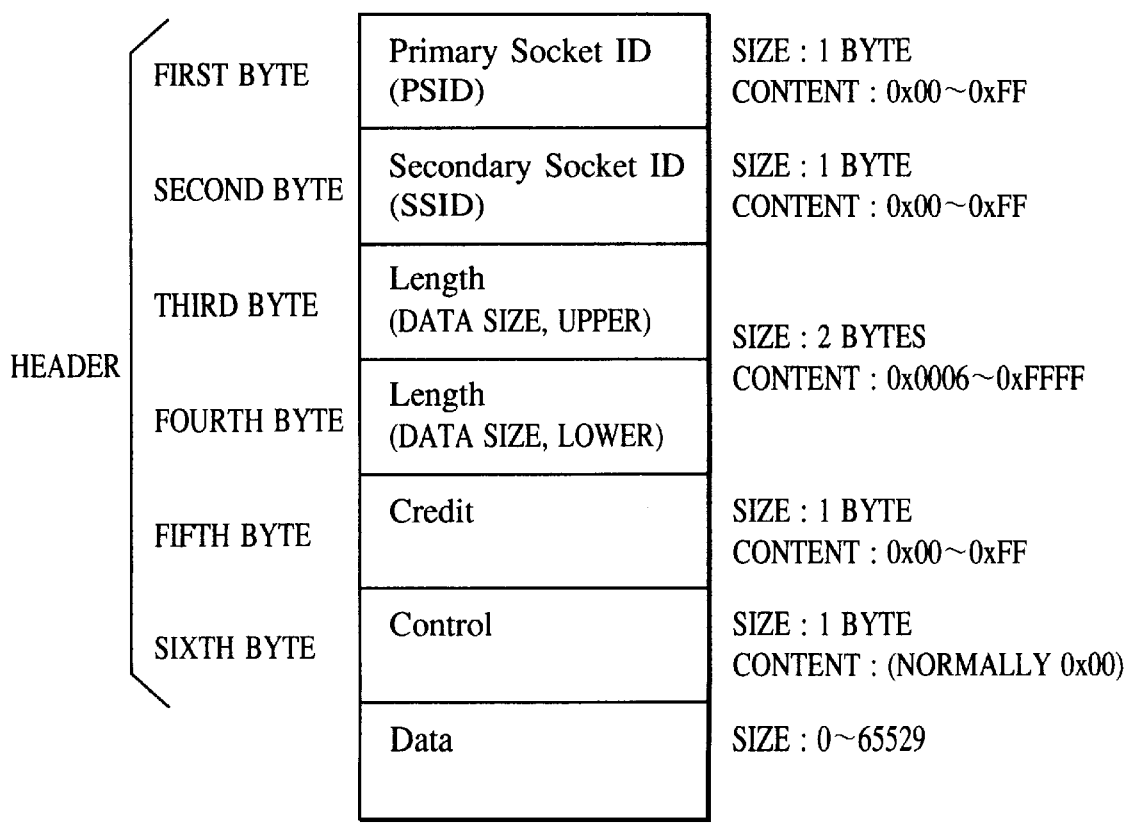
FIG. 8 illustrates the basic structure of a packet based on IEEE1284.4.

The configuration of data handled by IEEE1284.4 is as follows. The data handled by IEEE1284.4 is formed into a block having a plurality of bytes as a unit, which is referred to as a "packet". The structure of a packet is defined, as shown in FIG. 8, and the packet is formed of a 6-byte header and actual data followed by the header.

By observing the header in detail, the first byte indicates a primary socket ID (hereinafter referred to as a "PSID") and represents the socket ID of the apparatus that has initialized the control of IEEE1284.4. The socket ID will be described in detail later.

The second byte indicates a secondary socket ID (hereinafter referred to as an "SSID"), and represents the socket ID of the apparatus that has not initialized the control of IEEE1284.4.

The third byte and the fourth byte indicate the size of the entire packet including 6 bytes of the header. For example, if the entire packet includes 10-byte data, 16 (the sum of the 6 bytes of the header and the 10 bytes of the data) is filled in the third byte and the fourth byte. For comparison, data which is formed into a packet and data which is not formed into a packet are shown in FIGS. 9A and 9B, respectively. FIGS. 9A and 9B illustrate an example in which 10 letters, such as a, b, c, d, e, f, g, h, i, and j (for example, 10 bytes) are transferred. FIG. 9A indicates the data which is formed into a packet, which has 16 bytes based on the information represented in the leading header (6 bytes), while FIG. 9B indicates the data which is not formed into a packet, presenting no cohesion (continuity) of the individual items of data. If a packet has no data (0 bytes), the value (6) indicating 6 bytes of the header only is filled in the third byte and the fourth byte of the data shown in FIG. 8. The actual content of data is represented by hexadecimal, and is thus described by 0x0010 and 0x0006 (in hexadecimal, data is normally started by "0x", and one byte is expressed by two digits).

The fifth byte indicates a credit ("Credit"), which will be described in detail later. The sixth byte depicts control data, which is referred to as "Control". One bit of one byte of this control data indicates whether the packet is a normal one (in this case, represented by "0"). Most packets are normal and are thus indicated by "0". The remaining 7 bits are reserved areas, and are currently left unused (expressed by "0"). Accordingly, the byte of the control data is generally represented by 0x00.

In the data portion, the transfer data generated by an application program of each of the host apparatus and the printing apparatus or the control command in IEEE1284.4, which will be described later, is included.

Outline of Socket ID

The detailed description of the socket ID is as follows.

In the aforementioned multi-channeling, it is now assumed that a plurality of processings (mainly the processings of applications) are performed by two apparatuses connected via a single interface (for example, IEEE1284), and the processings in one apparatus identify the processings performed by the other apparatus, and vice versa, thereby independently performing data communications. The individual numbers provided for the respective processings to achieve such data communications are socket IDs.

The concept of the socket ID is as follows. For example, there are two processings (processing A and processing B) in applications performed by the host apparatus, and there are two processings (processing a corresponding to processing A and processing b corresponding to processing B) of applications performed by the printing apparatus. The PSID of processing A is set to be 0x10, while the PSID of processing B is set to be 0x20. The SSID of processing a is set to be 0x10, while the SSID of processing b is set to be 0x20. When processing A transmits data "A" and "I", the PSID and the SSID of the packet are set to be 0x10 and 0x10, respectively, under the control of IEEE1284.4. Similarly, when processing B transmits data "Ka" and "Ki", the PSID and the SSID of the packet are set to be 0x20 and 0x20, respectively. It is thus possible to recognize from which processing to which processing the transmitted packet has been transferred. As a consequence, the data is reliably transferred to the targeted processing, and a plurality of channels are logically utilized (achieving multi-channeling).

FIGS. 10 through 14 sequentially illustrate that data is independently transferred from a plurality of applications (two in the drawings) of the host apparatus to the targeted plurality of applications (two in the drawings) of the printing apparatus via the respective processings in the host apparatus and the printing apparatus.

Figure 10:
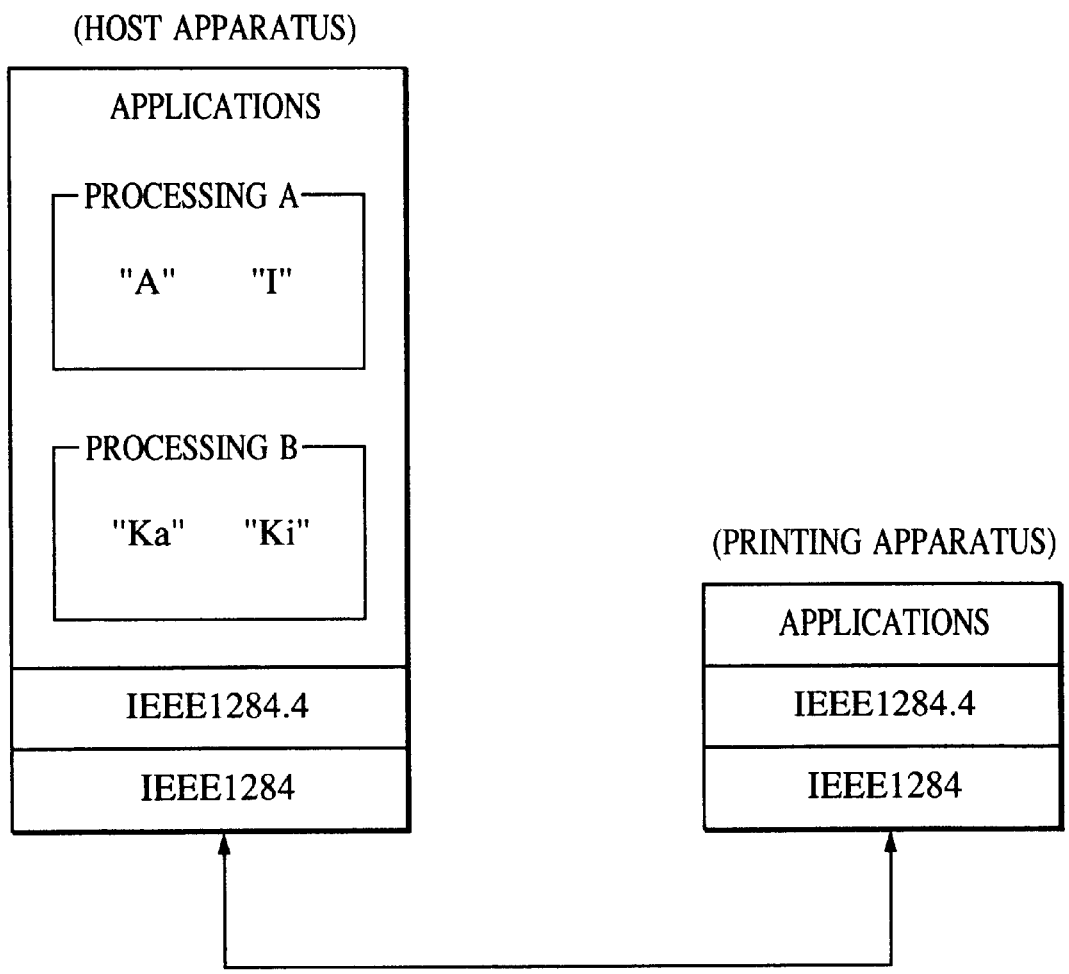
FIG. 10 illustrates the multi-channeling operation based on IEEE1284.4.

FIG. 10 illustrates that there are two processings in each application of the host apparatus, which respectively have data to be transferred (processing A="A" and "I", and processing B="Ka" and "Ki".

Figure 11:
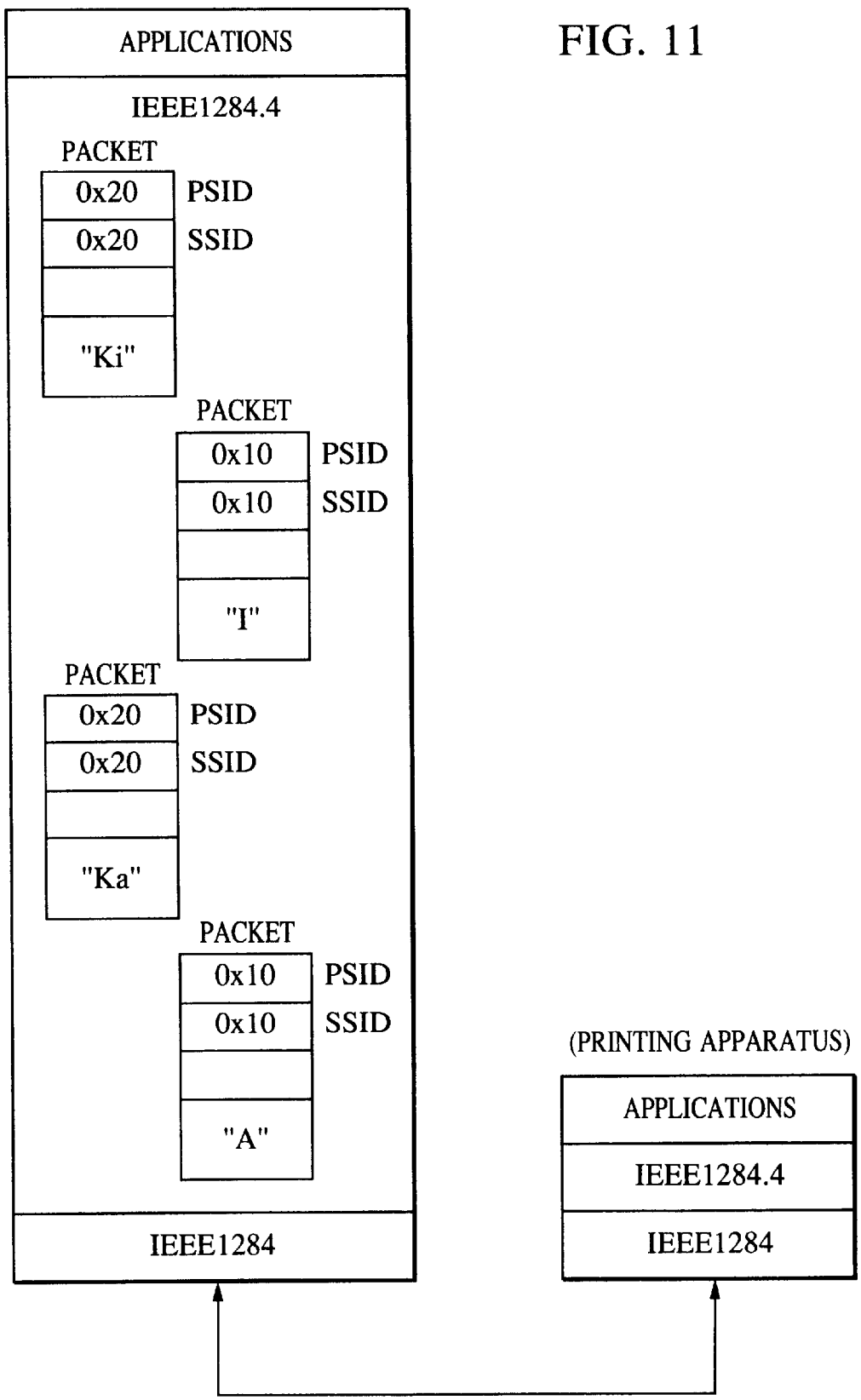
FIG. 11 illustrates the multi-channeling operation based on IEEE1284.4.

FIG. 11 illustrates that packets are created by the host apparatus under the processing of IEEE1284.4, and each packet is provided with the above-described socket ID. The procedure of transferring packets will be described later.

Figure 12:
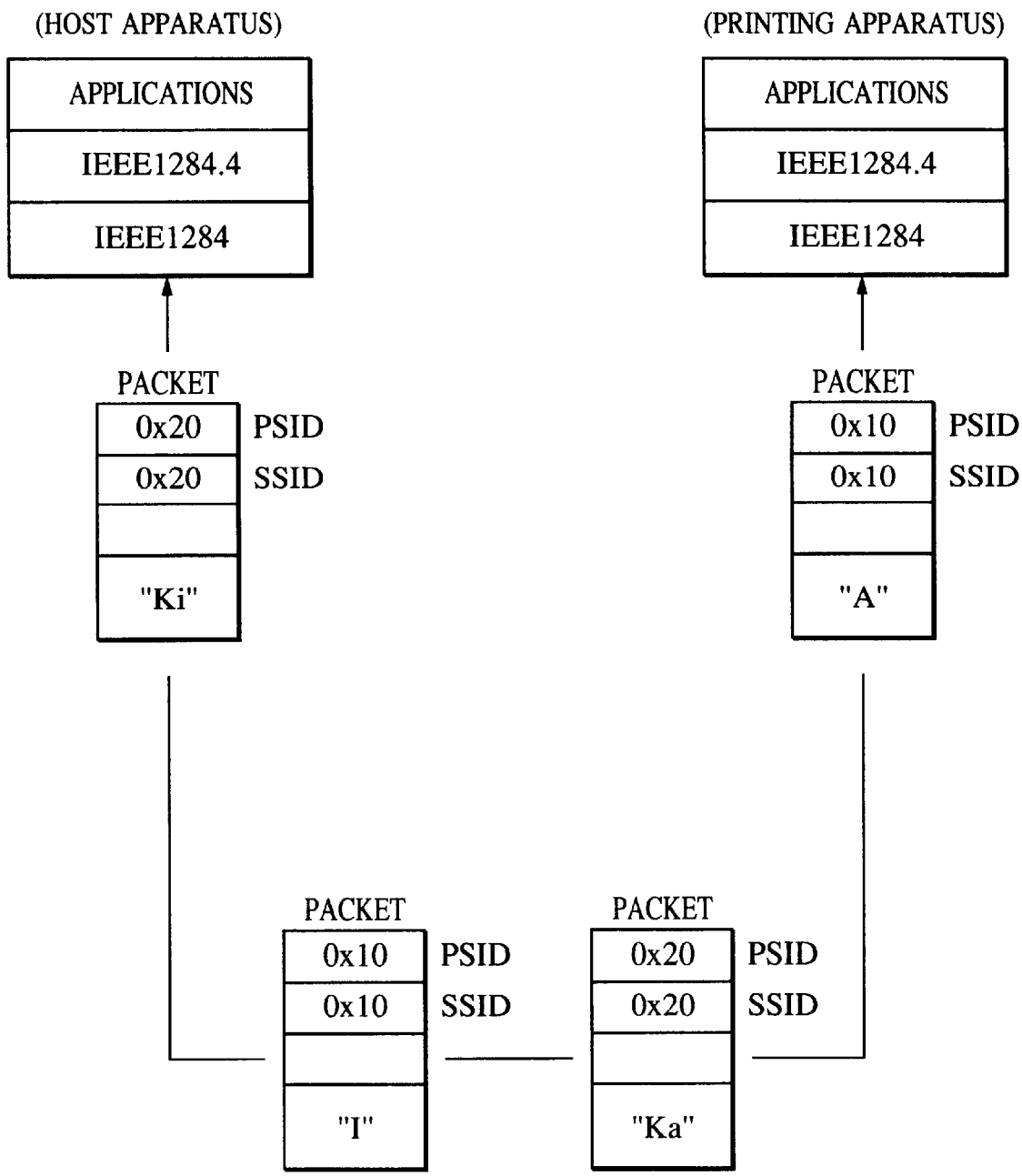
FIG. 12 illustrates the multi-channeling operation based on IEEE1284.4.

FIG. 12 illustrates that the data contained in the packets are being transferred to the printing apparatus from the host apparatus via the processing of the interface (IEEE1284). The order of transferring the packets is not specified, unlike FIG. 12. In FIG. 12, the four packets are sequentially transferred in the order of first processing A (the data containing "A"), first processing B (the data containing "Ka"), second processing A (the data containing "I"), and second processing B (the data containing "Ki").

Figure 13:
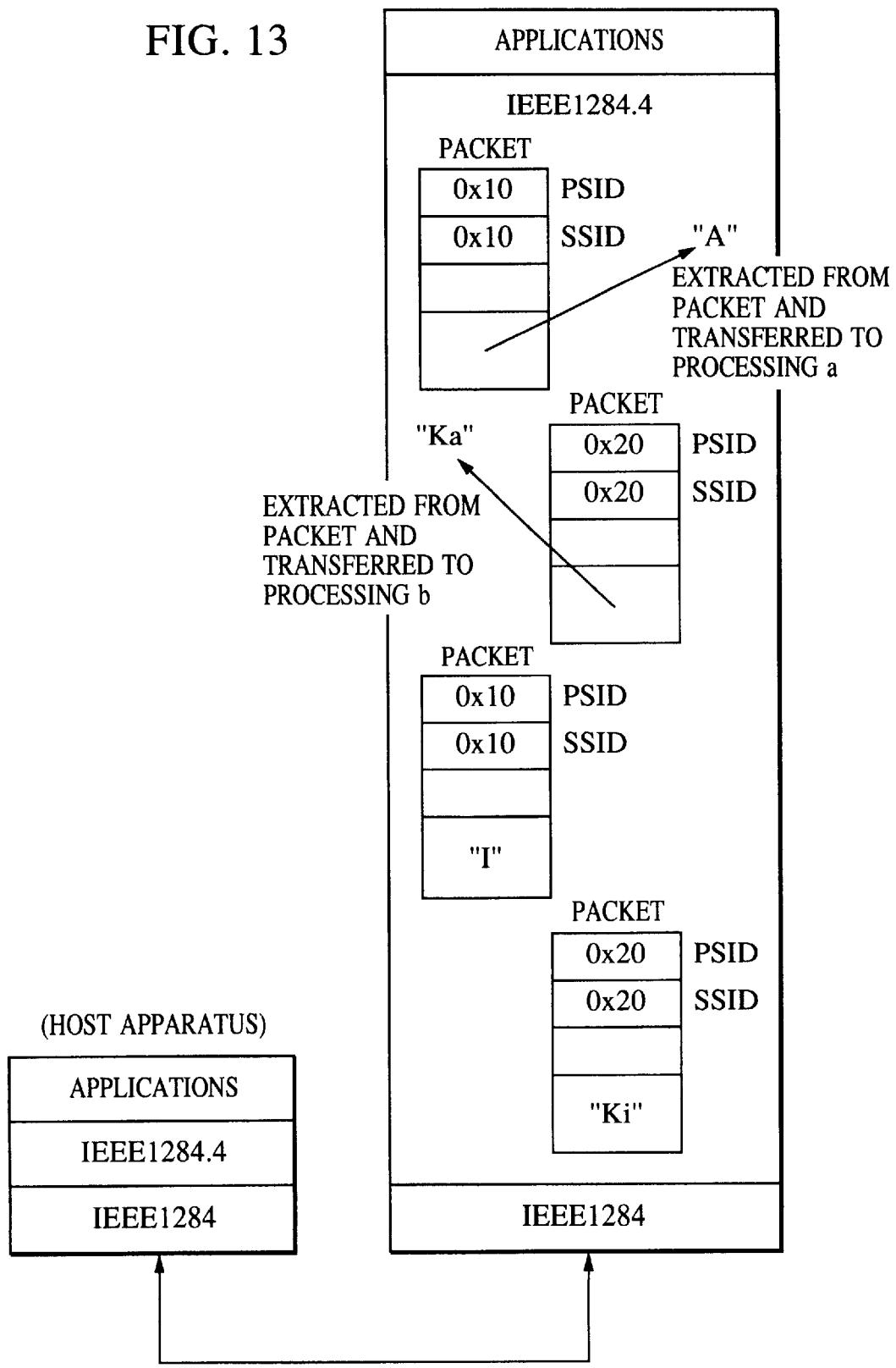
FIG. 13 illustrates the multi-channeling operation based on IEEE1284.4.
Figure 14:
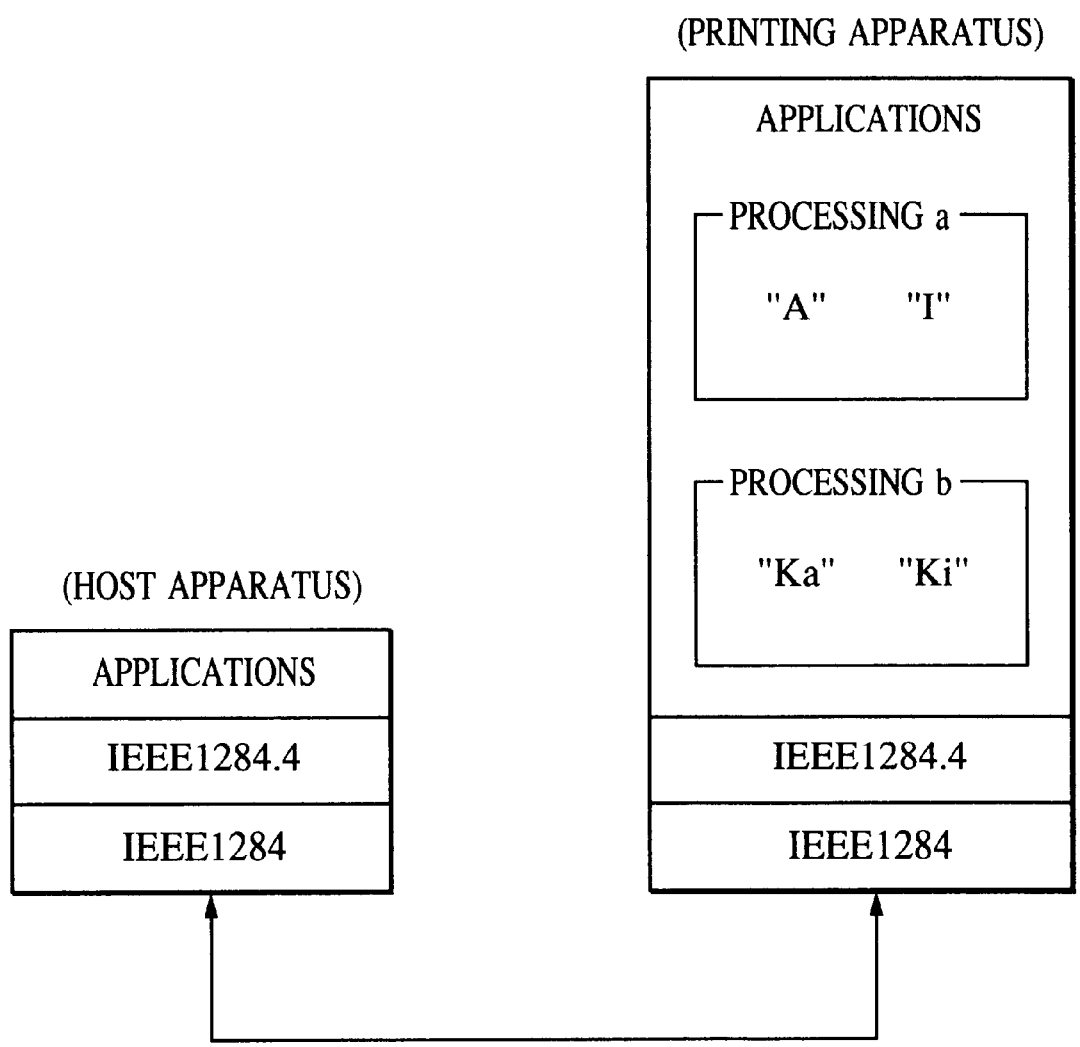
FIG. 14 illustrates the multi-channeling operation based on IEEE1284.4.

FIG. 13 illustrates that IEEE1284.4 of the printing apparatus receives the packets and extracts the data items from the packets, thereby transferring them to the respective applications according to the socket IDs. FIG. 14 illustrates that the data items have been transferred to the targeted processings (processings a and b) of the applications within the printing apparatus.

The same applies to the transfer operation from the processings of the printing apparatus to the processings of the host apparatus.

Socket IDs indicating 0x00 (both PSID and SSID are 0x00) are used only when transferring the command ("Command") required for executing the processing of IEEE1284.4 and the reply packet ("Reply Packet"), which will be discussed later.

Procedure of Basic Control in IEEE1284.4

Figure 15:
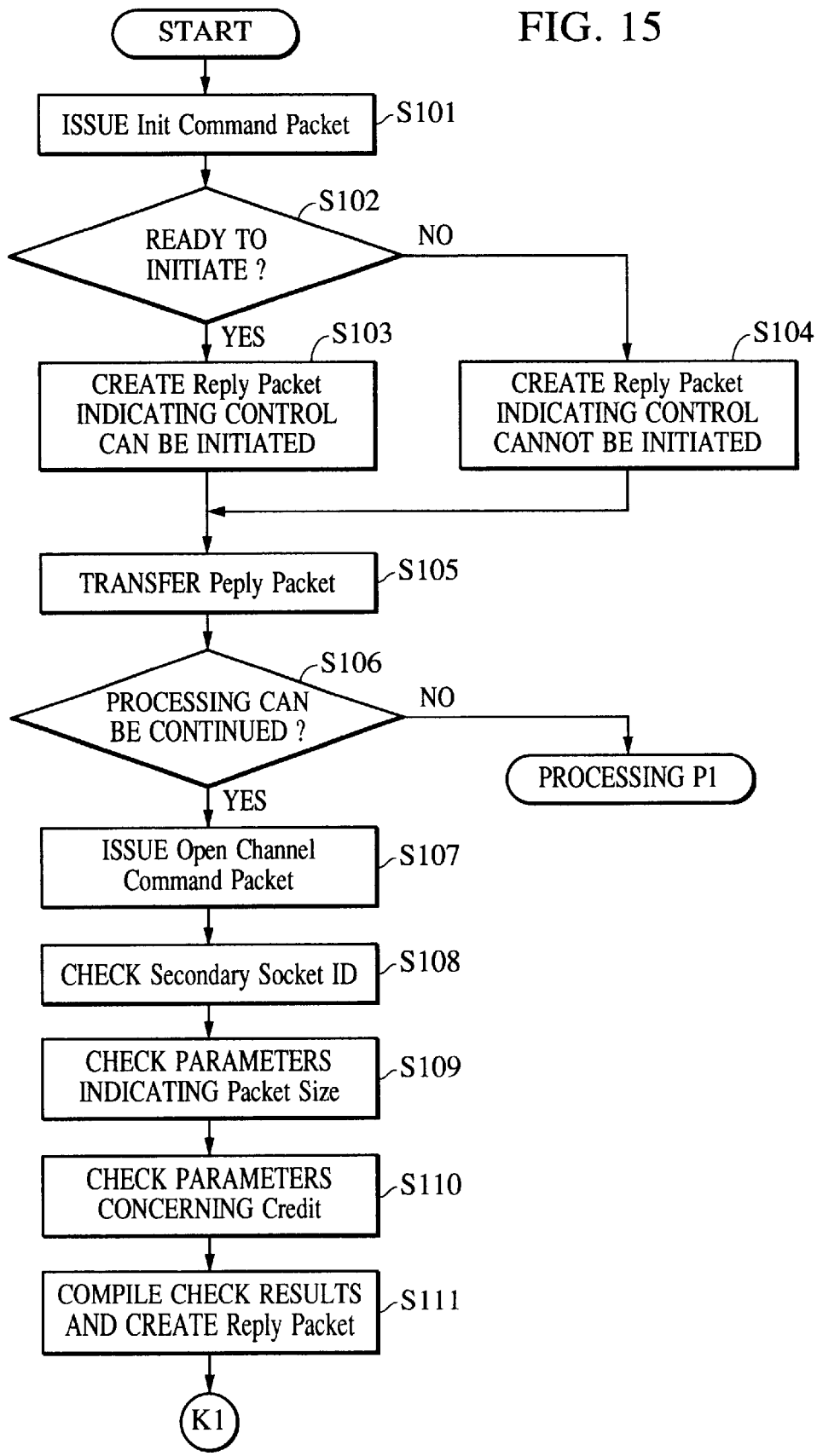
FIGS. 15, 16 and 17 are flow charts illustrating the basic operation of IEEE1284.4.
Figure 16:
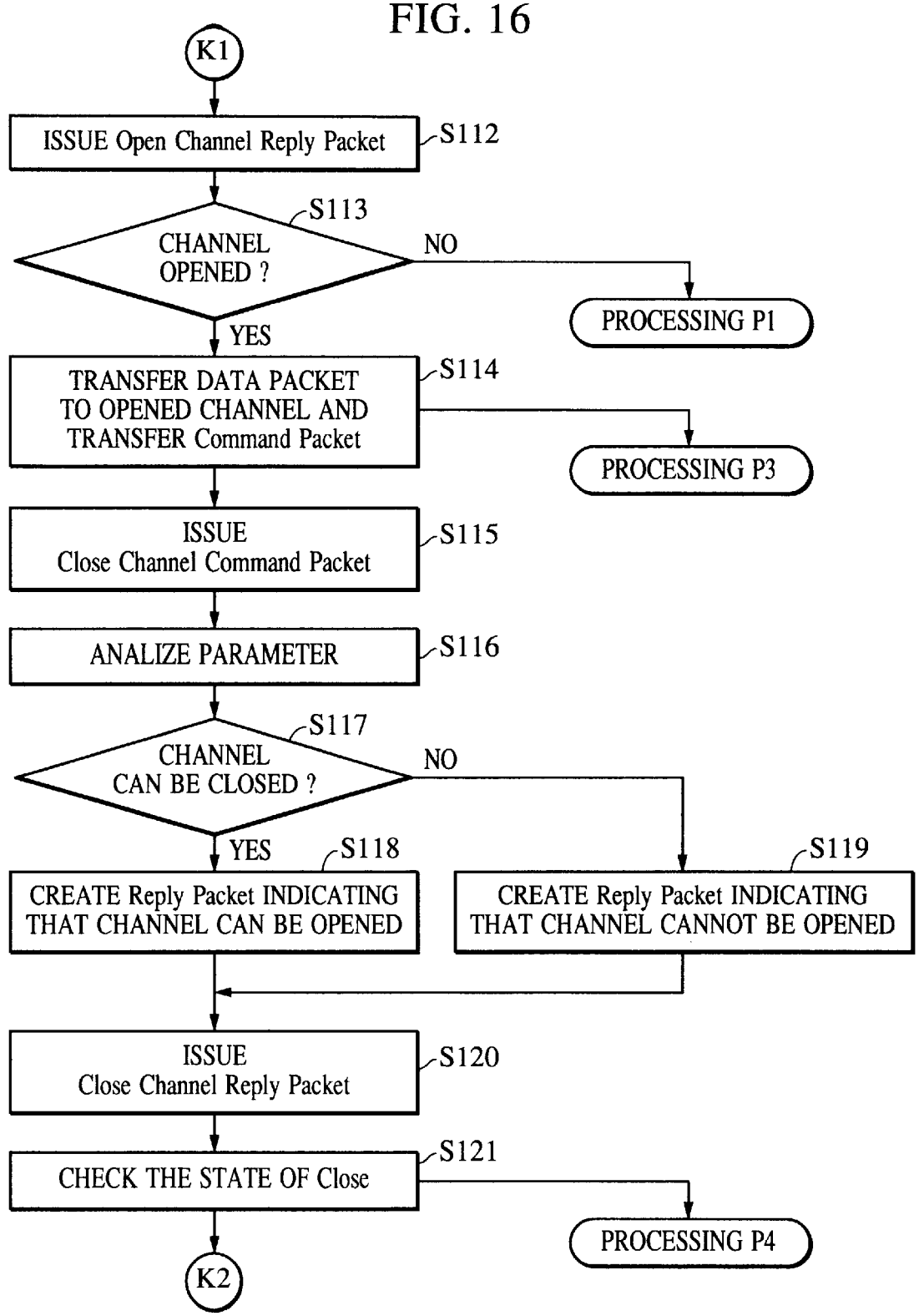
Figure 17:
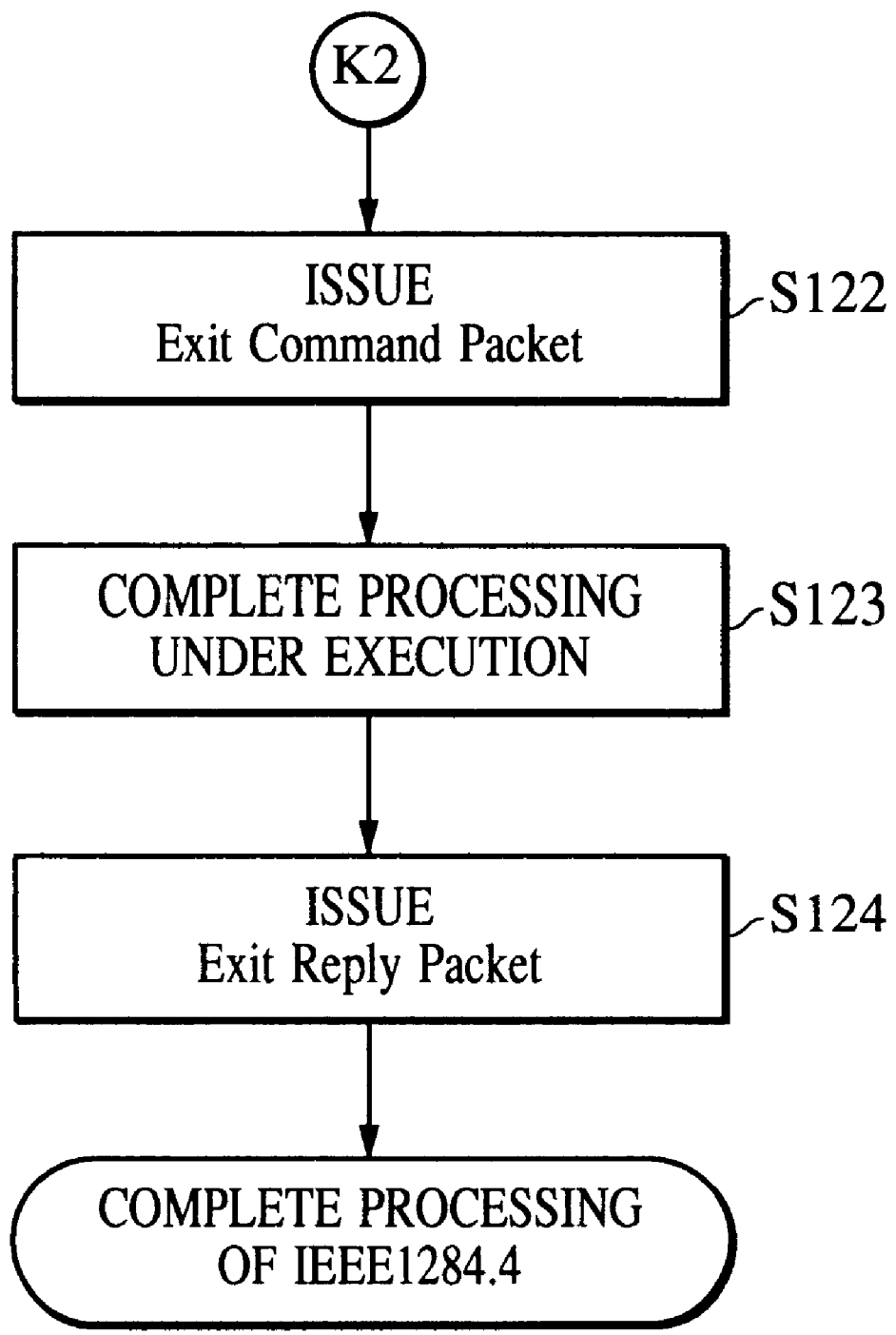

The procedure (flow) of the basic control in IEEE1284.4 is described below with reference to the flow charts of FIGS. 15, 16, and 17.

In step S101, one apparatus that is to initialize the control of IEEE1284.4 issues an init command packet ("Init Command Packet") to the other apparatus. Generally, the host apparatus issues the init command packet to the printing apparatus, and thus, the apparatus that has issued the init command packet is hereinafter referred to as the "host apparatus", while the other apparatus is hereafter referred to as the "printing apparatus". The init command packet has a data structure, such as the one shown in FIG. 18, and the portions other than the credit are fixed data in practice. Upon receiving the init command packet, the printing apparatus makes various determinations in step S102 of whether the control of IEEE1284.4 can be initiated. If the outcome of step S102 is yes, the corresponding init reply packet ("Init Reply Packet") is created in step S103, and the initialization for the start of the control of IEEE1284.4 is performed. If the result of step S102 is no, the corresponding init reply packet is produced in step S104.

Then, the init reply packet is returned to the host apparatus in step S105. The structure of the init reply packet is shown in FIG. 19. The init reply packet includes, as illustrated in FIG. 19, the data indicating whether the processing of IEEE1284.4 can be correctly started or whether it cannot be initiated for any reason ("Result"). By referring to the result data of the init reply packet, the host apparatus determines in step S106 whether the processing of IEEE1284.4 can continue.

Figure 20:
FIG. 20 illustrates the basic structure of a packet used under the control of IEEE1284.4.

If the outcome of step S106 is yes, the host apparatus issues an open channel command packet ("Open Channel Command Packet") in step S107. If the result of step S106 is no, the init command packet is again transferred to the printing apparatus, or the processing of IEEE1284.4 is discontinued (processing P1). The structure of the open channel command packet is shown in FIG. 20.

Upon receiving the open channel command packet, the printing apparatus checks in step S108 whether the secondary socket ID, which is one of the parameters contained in the packet, coincides with the SSID of the printing apparatus. If the result of step S108 is yes, the printing apparatus establishes (opens) a channel.

According to a combination of the socket IDs (PSID and SSID), the established (opened) channel can be identified. In the above-described discussion of the socket ID, the channel which links processing A of the application of the host apparatus and processing a of the application of the printing apparatus can be identified by a combination of the socket IDs (PSID=0x10 and SSID=0x10). Likewise, the channel which links processing B of the application of the host apparatus and processing b of the application of the printing apparatus can be identified by a combination of the socket IDs (PSID=0x20 and SSID=0x20).

Subsequently, in step S109, the primary-to-secondary packet size ("Primary To Secondary Packet Size", hereinafter referred to as a "first packet size"), which is a parameter representing the maximum value of the packet size demanded by the host apparatus and required for transferring from the host apparatus to the printing apparatus, is checked. Also, the secondary-to-primary packet size ("Secondary To Primary Packet Size", hereinafter referred to as a "second packet size"), which is a parameter indicating the maximum value of the packet size demanded by the host apparatus and required for transferring from the printing apparatus to the host apparatus, is checked. It is then determined in step S109 whether the above packet sizes can be handled by the respective apparatuses.

If the outcome of step S109 is yes, the corresponding parameter is set in an open channel reply packet ("Open Channel Reply Packet"), which will be discussed later. If the result of step S109 is no, parameters representing the first and second packet sizes that can be handled by the respective apparatuses are set in the open channel reply packet.

Thereafter, in step S110, parameters representing the information concerning the credit demanded by the host apparatus, i.e., credit requested ("Credit Requested") and a maximum outstanding credit ("Maximum Outstanding Credit") are analyzed. A reply in response to the demand represented by a combination of the above two parameters is set in the open channel reply packet.

Figure 21:
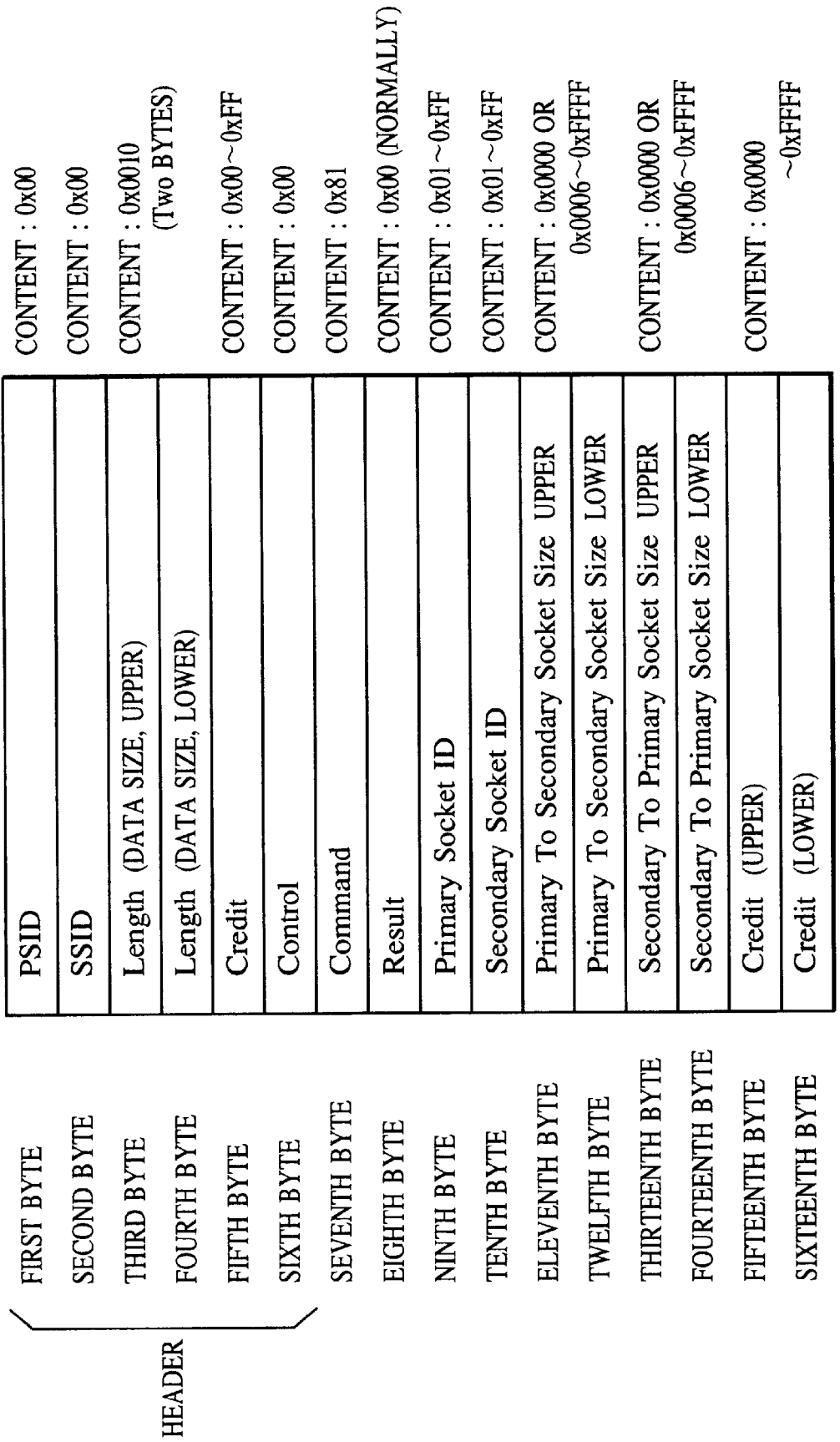
FIG. 21 illustrates the basic structure of a packet used under the control of IEEE1284.4.

After the individual parameters of the open channel command have been analyzed, the printing-apparatus compiles the replies to create an open channel reply packet in step S111, and then transfers it to the host apparatus in step S112. The structure of the open channel reply packet is shown in FIG. 21.

The host apparatus analyzes the parameter of the open channel reply packet and determines in step S113 whether the channel is opened. If it is found in step S113 that the channel is not opened, another channel is opened, i.e., the process returns to step S107, or the control of IEEE1284.4 is completed. In the latter case, the process proceeds to step S122, which will be described later (processing P2).

If it is found in step S113 that the channel is opened, the data packet is transferred to the opened channel in step S114. The data packet is structured, as illustrated in FIG. 8. Upon comparing the packet size demanded by the host apparatus that has issued the open channel command packet and the packet size demanded by the printing apparatus and responded in the open channel reply, a smaller packet size is employed. The data packet may be transferred in the direction opposite to the above-described direction (i.e., from the printing apparatus to the host apparatus), and the command packet concerning the credit, which will be discussed later, is effectively transferred at this point. The command packet may be transferred before the channel is opened, but this is meaningless.

The channel can be opened as many times as the processing of the apparatus permits or as long as the combinations of the socket. IDs are not doubly used (i.e., the process returns to step S107, processing P3). According to the description of the socket IDs, two channels, i.e., the channel which links processing A of the host apparatus and processing a of the printing apparatus and the channel which links processing B of the host apparatus and processing b of the printing apparatus, are opened.

A description has been given of the procedure of opening the channels that link the processings of the applications performed by the host apparatus and those by the printing apparatus. The channels (hereinafter referred to as the "command channels") for transferring various commands for the control of IEEE1284.4 and replies (such as init and open channel) are opened implicitly, and are not required to follow the foregoing procedure.

As discussed above, the socket ID for identifying the channel is represented by 0x00. The channel through which data communications have been completed (or are desirably completed) can be closed by a close channel command packet ("Close Channel Command Packet"). When closing a channel, the host apparatus transfers the close channel command packet to the printing apparatus in step S115. The structure of the close channel command packet is shown in FIG. 22.

A combination of the socket IDs representing the channel to be closed is expressed in the primary socket ID and the secondary socket ID, which are parameters of the close channel command packet. The printing apparatus analyzes the parameters in step S116 and checks in step S117 whether the designated channel can be closed (i.e., whether the channel is open). If the outcome of step S117 is yes, the channel is closed, and a close channel reply packet ("Close Channel Reply Packet") indicating that the channel is closed is created in step S118.

If the result of step S117 is no, a close channel reply packet indicating that the channel cannot be closed is created in step S119. The created reply packet is then transmitted to the host apparatus in step S120. The structure of the close channel reply packet is shown in FIG. 23.

Upon receiving the close channel reply packet, the host apparatus analyzes "Result", which is a parameter of the reply packet, and confirms in step S121 that the channel is closed. After the channel is closed, it may be opened by the close channel command packet if required (i.e., the process returns to step S107, processing P4), or the control of IEEE1284.4 may be completed. In the latter case, the host apparatus transmits an exit command packet ("Exit Command Packet") to the printing apparatus in step S122. The structure of the exit command packet is shown in FIG. 24.

Upon receiving the exit command packet, the printing apparatus completes the processing of IEEE1284.4 (such as data communications on the opened channel) in step S123, and then creates an exit reply packet ("Exit Reply Packet") and transfers it to the host apparatus in step S124. The structure of the exit reply packet is shown in FIG. 25. The control of IEEE1284.4 is thus completed, and data transfer by using the packets (of IEEE1284.4) is also finished.

If it is desired that the control of IEEE1284.4 be recommenced, it is necessary to start the process from the issue of the init command packet. The exit command packet, as well as the other command packets, may be issued at any time while the control of IEEE1284.4 is being executed.

In the foregoing processing of IEEE1284.4, if the process proceeds up to step S114 in which the channel is opened, the transfer of a data packet can be started. However, a data packet cannot be transferred unless a credit is sent to the host apparatus from the processing of the printing apparatus. This enables IEEE1284.4 to implement the flow control of the data (packet). More specifically, according to the description of the socket IDs, processing A of the host apparatus cannot transfer a packet to the printing apparatus unless it receives a credit from processing a of the printing apparatus.

The flow control is performed as follows. If it is necessary to temporarily store data transferred from an external apparatus in a resource (generally a buffer, which is a storage device from/into which data can be read/written; in this embodiment, a receiving buffer of the printing apparatus) within the printing apparatus to receive the data, control should be performed so that the data can be prevented from being received in excess of the capacity of the receiving buffer, which would otherwise cause overflow of data and hamper correct operation. To avoid such a situation, the flow control is performed to appropriately discontinue and restart the data transfer.

Concept of Credit

A description is given below of the concept of the credit used in the flow control of the packet transfer in IEEE1284.4.

The credit is issued from the receiving end of the packet to the transmitting end, and indicates the capacity of the receiving end to receive the packet. The receiving end guarantees that the packets represented by a credit can be reliably received. To transfer a credit, a credit command packet.("Credit Command Packet"), a credit request command packet ("Credit Request Command Packet"), and a reply packet ("Reply Packet") in response to the credit request command packet are mainly utilized. A data packet ("Data Packet") or an open channel reply packet may also be employed to issue a credit. However, the command channel is an exception in that it has two credits when initialization is performed, so that the init command packet of IEEE1284.4 can be issued or error handling can be executed at any time.

Transition of Credit Status

The transition of the credit status is briefly explained with reference to FIG. 26.

When the apparatuses are initialized, such as when apparatuses (host apparatus and printing apparatus) are powered on, the credit for the command channel is "2", and the credit for the data (packet) transfer channel (not yet opened at this point) is "0". It is assumed that only one channel is used in this example. If, however, a plurality of channels are opened, the management of credits is performed on each channel.

Upon issuing the init command packet to start the control of IEEE1284.4 by the host apparatus, the credit for the command channel in the host apparatus is reduced by one to "1". Simultaneously, upon receiving the init command packet, the credit for the command channel in the printing apparatus is increased by one to "3". This is because it is determined that the credit parameter (the fifth byte of the header) of a packet to be transferred in the command channel always contains 1. If the credit were to be reduced to 0 in the command channel, which would make it impossible to transmit a packet, the subsequent processing could not continue.

In response to the init command packet, the printing apparatus returns the init reply packet to the host apparatus. Accordingly, the credit for the command channel in the printing apparatus is decreased by one to "2", while the credit for the command channel in the host apparatus is increased by one to "2". Subsequently, when the host apparatus attempts to open the data channel by the open channel command packet, and when the printing apparatus correctly returns the open channel reply packet to the host apparatus and issues two credits to the host apparatus by using the credit parameters (the fifteenth and sixteenth bytes) of the open channel reply packet, the credit for the data transfer channel in the host apparatus is increased by two to "2".

Since the host apparatus has opened the data transfer channel and has received the credits for the data transfer channel from the printing apparatus, it is ready to transfer data packets. The host apparatus then sequentially transfers two data packets. When transferring the second data packet, one credit for the data transfer channel is issued to the printing apparatus by using the credit parameter (the fourth byte) of the data packet.

Simultaneously, the credit for the data transfer channel in the printing apparatus is increased by one to "1". The credit for the command channel remains at "2" since neither the host apparatus nor the printing apparatus transfers a command packet. At this time, the printing apparatus is ready to transfer data packets to the host apparatus.

Figure 27:
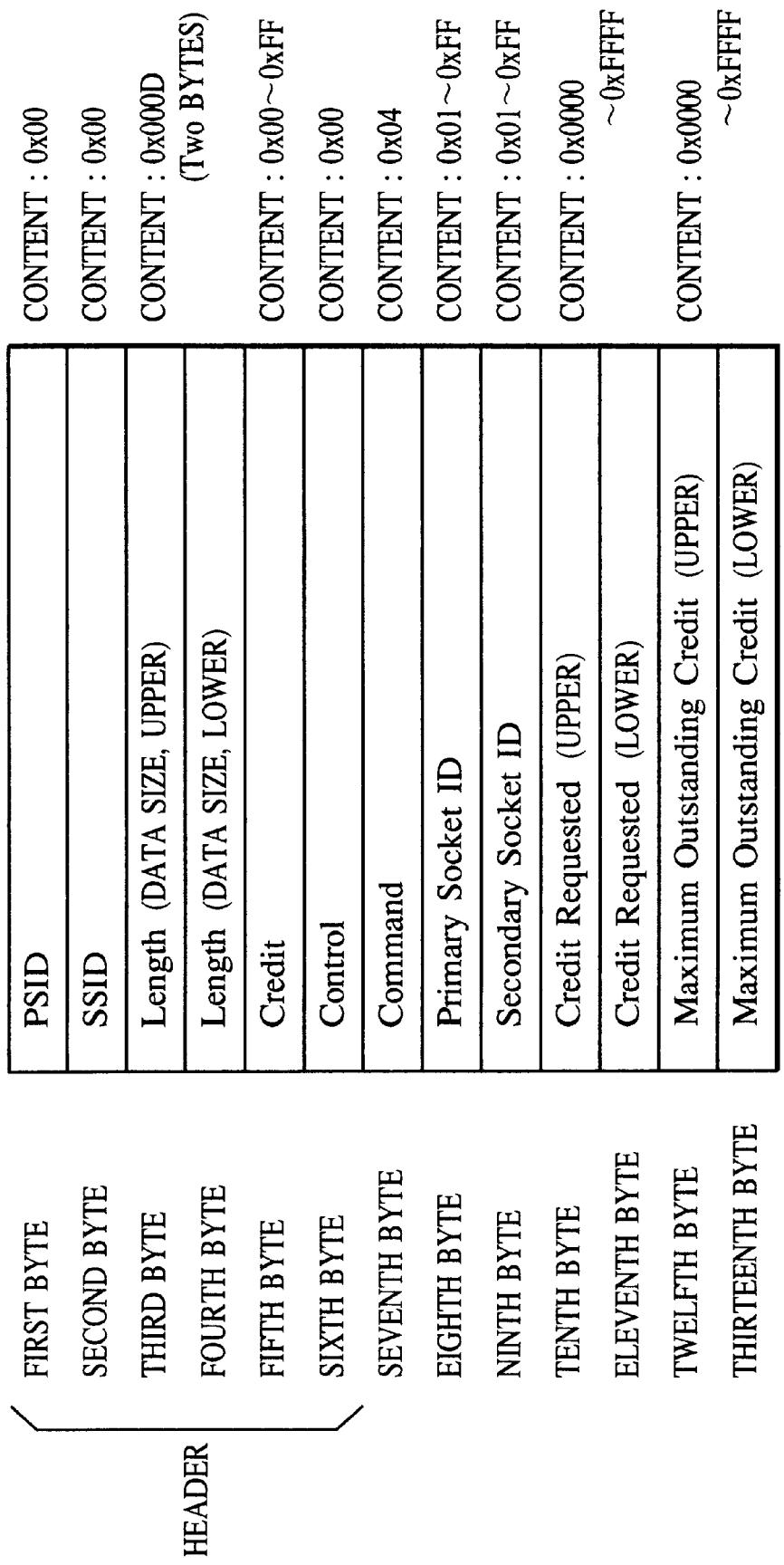
FIG. 27 illustrates the basic structure of a packet used under the control of IEEE1284.4.

Since the host apparatus has sequentially transferred two data packets and has used all the credits for the data transfer channel, it requests the printing apparatus to send a credit by using the credit request command packet so as to transfer a subsequent data packet. The structure of the credit request command packet is shown in FIG. 27.

Figure 28:
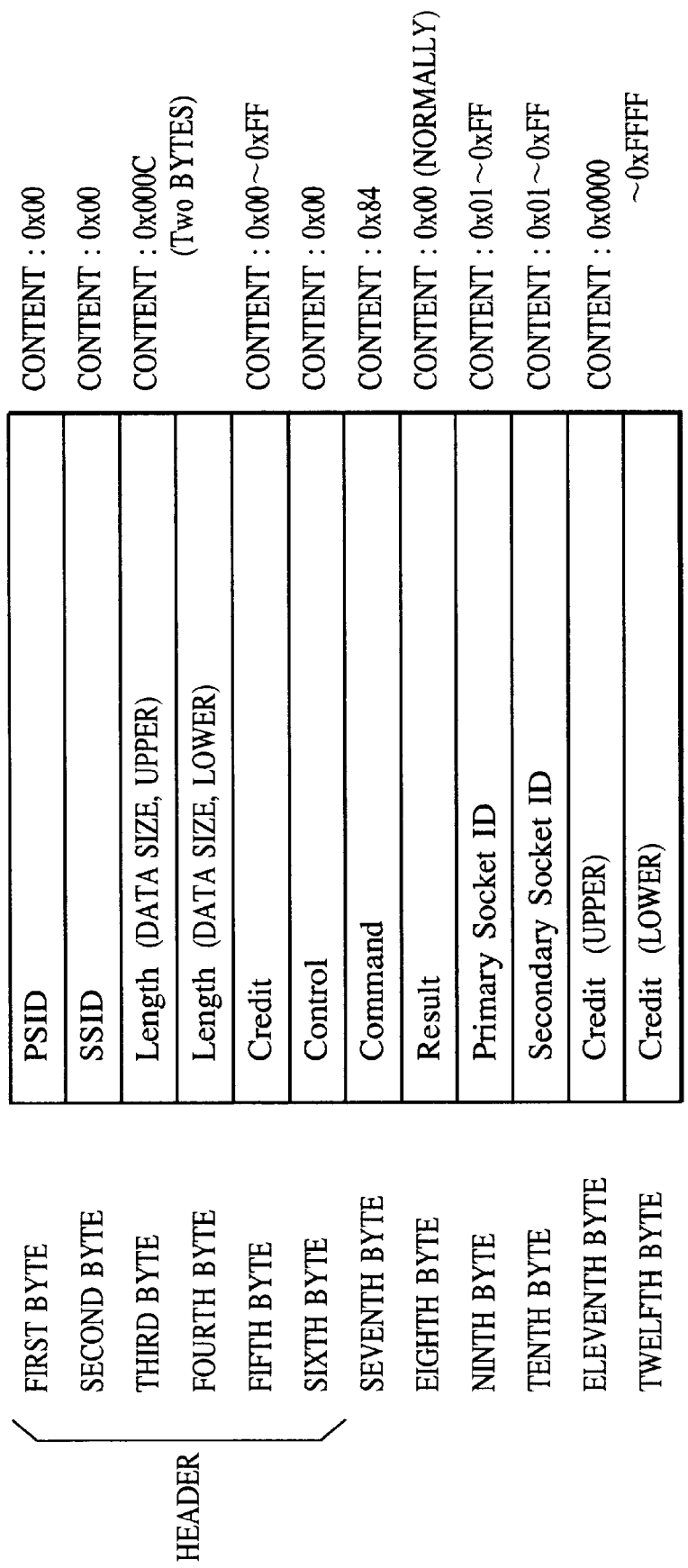
FIG. 28 illustrates the basic structure of a packet used under the control of IEEE1284.4.

In response to the request from the host apparatus, the printing apparatus analyzes the content of the request (refers to the parameters), and returns a reply to meet the requirement of the request. In this example, the printing apparatus issues only one credit to the host apparatus. The credit is transferred to the host apparatus while being contained in the credit parameters (the eleventh and twelfth bytes) of the credit request reply packet. The structure of the credit request reply packet is shown in FIG. 28.

Upon receiving the credit request reply packet from the printing apparatus, the credit for the data transfer channel in the host apparatus is increased by one to "1", thereby enabling the host apparatus to transfer data packets again. Since the printing apparatus has received one credit for the data transfer channel from the host apparatus, it is also able to transfer one data packet.

Then, the printing apparatus transfers the data packet to the host apparatus, as illustrated in FIG. 26, and the credit for the data transfer channel has been consumed to "0". When transferring the data packet, a credit can be issued to the host apparatus by employing the credit parameter contained in the data packet. This increases the credit for the data transfer channel in the host apparatus by one to "2", as shown in FIG. 26.

Control Procedure of Printing Apparatus according to the Present Invention

Figure 29:
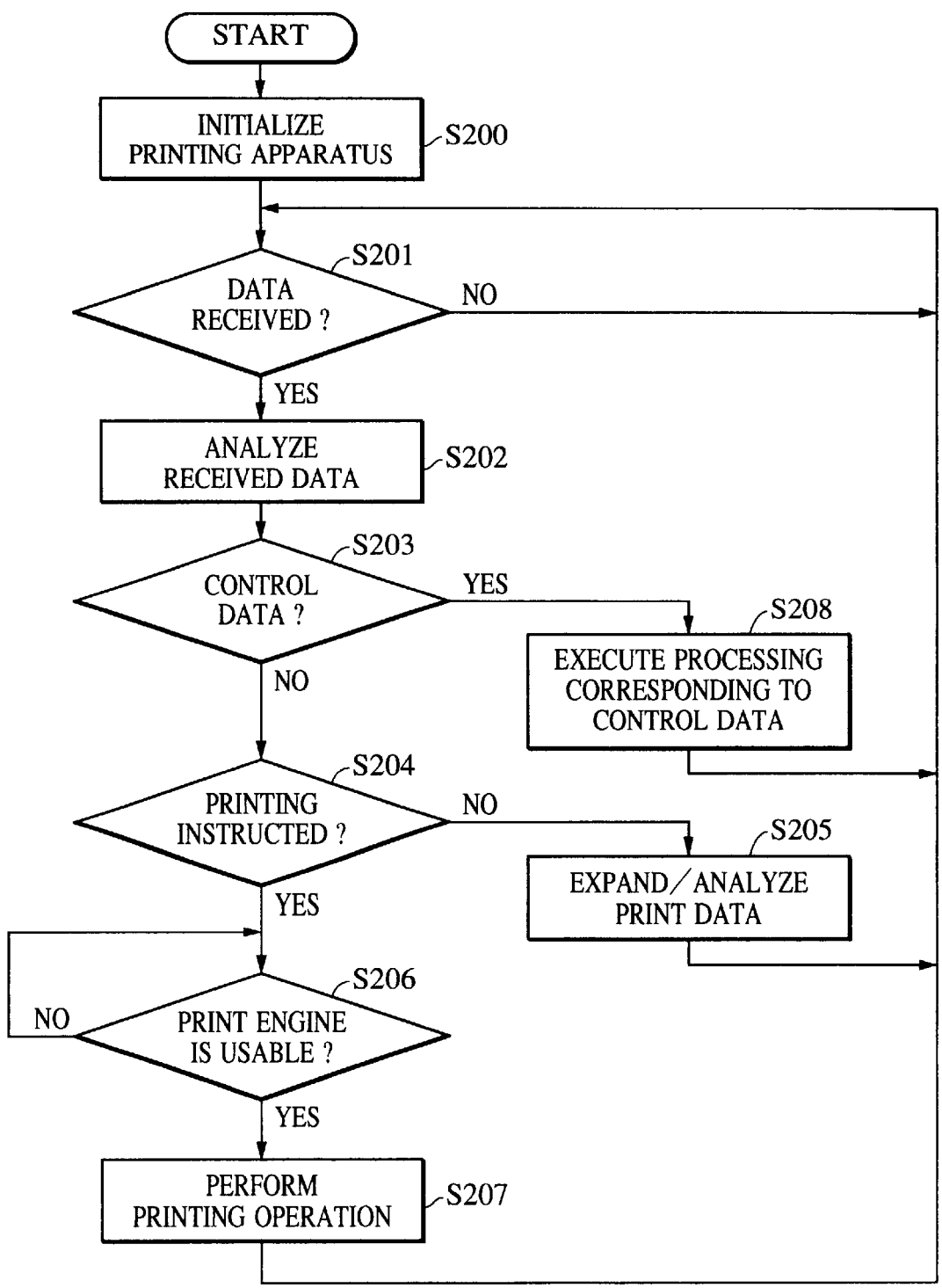
FIGS. 29, 30 and 31 are flow charts illustrating a control procedure of a printing apparatus according to the present invention.

FIG. 29 is a flow chart illustrating a control procedure of a printing apparatus according to the present invention.

Upon completion of the initialization of the printing apparatus by being supplied with power in step S200, the process generally waits for the data to be transferred from a host apparatus in step S201. It is assumed in this embodiment that the printing apparatus is set to receive data according to the aforementioned first transfer method (no restrictions are imposed on the continuity of data) by initializing the printing apparatus. In this first transfer method, data is transferred merely by using the above-described IEEE1284-1994. In receiving print (control) data according to this embodiment, processing, such as the one indicated by the flow chart of FIG. 30 is executed by hardware (not shown), and the receiving of a plurality of bytes of print (control) data can be informed by generating interrupt handling (or monitoring a flag).

Figure 30:
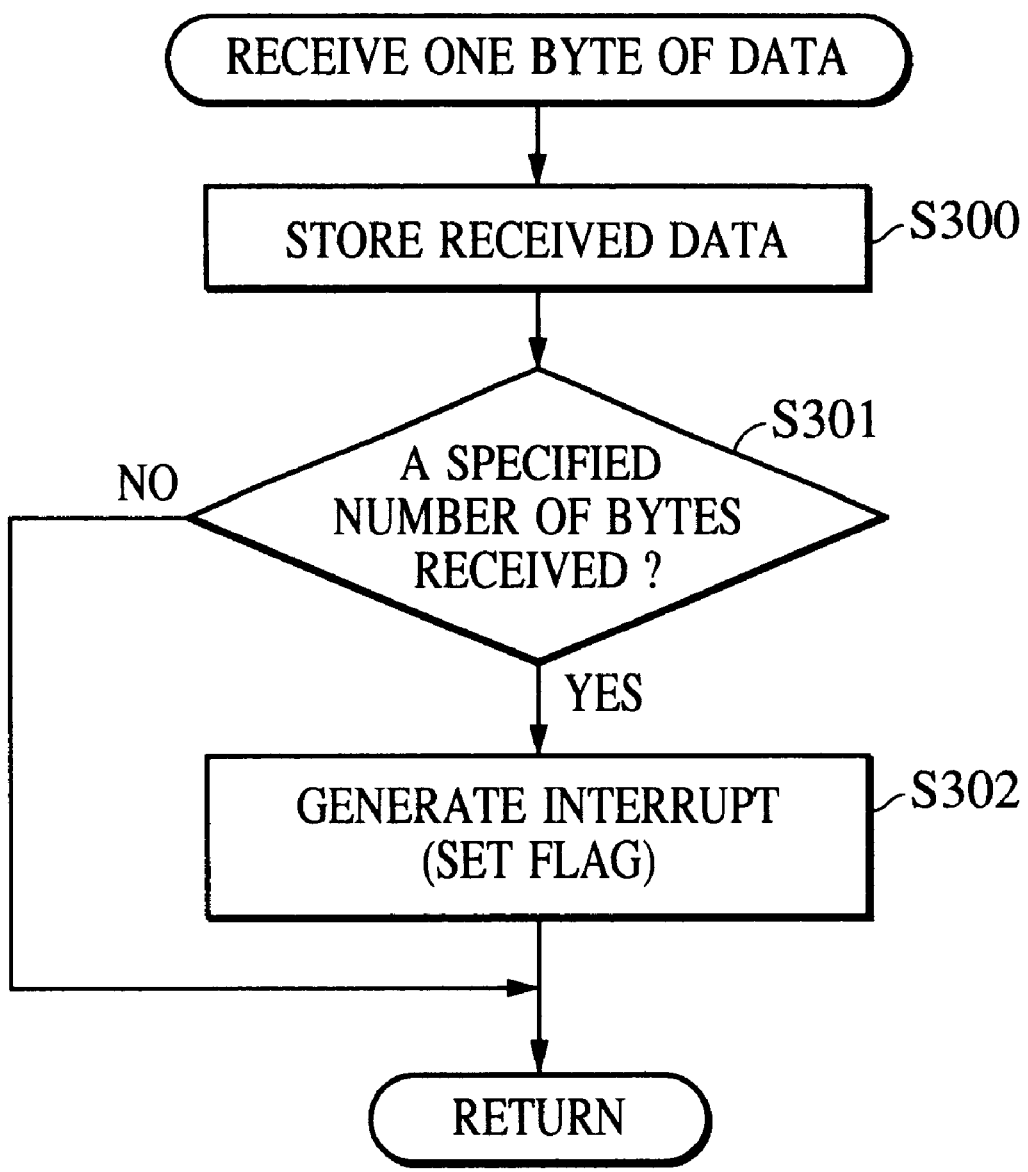

Referring to FIG. 30, when one byte of print (control) data is transferred, it is automatically stored in a predetermined area of the memory (RAM 119) in step S300. The area of the memory to be used for storing the data has been determined when the printing apparatus was initialized in step S200. The process proceeds to step S301 in which a check is made of whether the number of bytes of the print (control) data set in step S200 has reached. If the outcome of step S301 is yes, interrupt is generated, or a flag indicating that the specified number of bytes of the print data has been received is set in step S302. If the result of step S301 is no, the process waits for subsequent data to be transferred. That is, interruption handling (or flag setting) in step S302 corresponds to step S201 in which the process waits for the print (control) data to be received.

After the preset number of bytes of print (control) data has been received, the received data is analyzed in step S202. Upon analysis in step S202, if it is determined in step S203 that the received data represents control data, the processing corresponding to the control data is performed in step S208: for example, determining the portions to which a printed sheet is discharged, initializing the content of the printer-mode information set by the operation unit 1012 and stored in the aforementioned NVRAM (not shown), or changing the setting of the printing apparatus.

Upon completion of analysis in step S202, if it is found in step S203 that the received data does not represent control data but print data, a determination is further made in step S204 of whether the print data indicates an instruction to perform (start) a printing operation. If the outcome of step S204 is no, the print data is further analyzed/expanded, and the process waits for the printing operation to be executed in step S205.

If the result of step S204 is yes, the process proceeds to step S206 in which it is checked whether the print engine 117 is usable. If the outcome of step S206 is no, the process waits for the print engine to be usable. If the result of step S206 is yes, the analyzed/expanded print data is printed in step S207. Generally, according to the above-described flow, the print (control) data is received, and based on the data, the printing operation is performed.

If the interface 121 connecting the printing apparatus and the host apparatus is a parallel interface (generally referred to as a "Centronics interface") defined by IEEE1284-1994, the data can be transferred from the printing apparatus to the host apparatus (hereinafter referred to as a "reverse transfer mode") by using known signal lines according to the aforementioned nibble mode, byte mode, or ECP mode. When switching into the reverse transfer mode, the host apparatus makes a request to automatically identify the various settings of the printing apparatus, which is referred to as a "device ID request". The device ID request is specified in IEEE1284-1994, though it is now shown.

Changing of Transfer Method

In this embodiment, the transfer method for the print (control) data is changed by utilizing the above-described device ID request. Changing of the transfer method is described below with reference to the flow chart of FIG. 31.

It is possible for the host apparatus to make the device ID request at a certain timing by utilizing the technique specified in IEEE1284-1994. In this technique, the state of a signal line other than the signal lines on the Centronics interface is changed while print (control) data is being transferred in the aforementioned compatibility mode.

Figure 31:
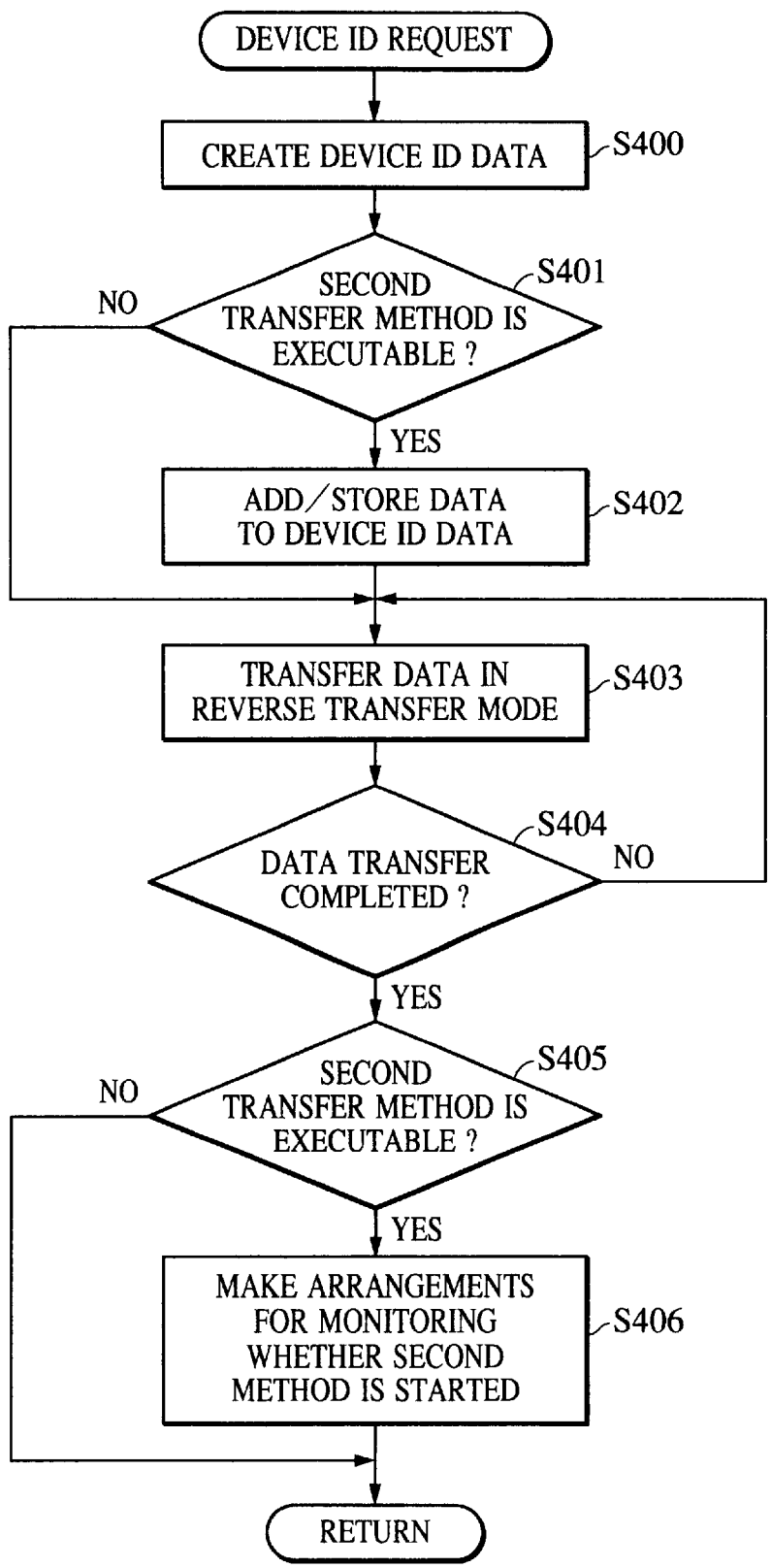

In FIG. 31, in response to the device ID request made from the host apparatus, the printing apparatus creates data (character string data: an example of such data is shown in FIG. 32) to be transferred in the reverse transfer mode in step S400. The data to be transferred to the host apparatus may be stored in the ROM 113 in advance.

The printing apparatus then determines in step S401 whether the aforementioned second transfer method (the transfer method utilizing packets, for example, the method using the above-described IEEE1284.4, and hereinafter simply referred to as a "packet transfer method") is executable. This determination does not, however, rely upon the printing apparatus, but is made by checking whether the control program stored in the ROM 113 or the external memory device 114 within the printing apparatus or the control program downloaded through the input unit 118 or another input unit (not shown) and stored in the RAM 119 is compatible with the packet transfer method.

If it is found in step S401 that the packet transfer method is executable, a specific character string is added to the device ID data to be transferred to the host apparatus and is stored in step S402. An example of the device ID data provided with a specific character string is shown in FIG. 33. If it is found in step S401 that the packet transfer method is not executable because of the internal state of the printing apparatus (for example, because there is a fault in the apparatus), a specific character string is not added to the device ID data, i.e., step S402 is skipped.

The created device ID data is transferred to the host apparatus in the reverse transfer mode in step S403. It is then checked in step S404 whether the device ID data has been transferred. If the outcome of step S404 is yes, the process proceeds to step S405 in which a determination is further made of whether the printing apparatus is able to execute the packet transfer method again. This determination may be made by using the data stored in step S402.

If it is found in step S405 that the packet transfer method is executable, the flow proceeds to step S406. In step S406, the printing apparatus predicts that the print (control) data to be subsequently (immediately) transferred from the host apparatus which has identified (analyzed) the device ID data provided with the character string indicating that the printing apparatus is able to execute the packet transfer method, is also based on the packet transfer method, and performs the processing required for analyzing the print data. More specifically, in order to change the processing for analyzing the, received data, which will be described later, the number of bytes of the received data used (for comparison) in step S301 of FIG. 30 is reset, or the state of the flag for making determinations is changed (the use of the flag will be discussed later).

Upon completion of the processing required for analyzing the print data, the analysis of the received data is started in step S202 of FIG. 29 by checking whether the first 6 to 10-odd bytes of the header conform to the packet transfer method. If the result of this check is yes, it is determined that the remaining print (control) data to be transferred from the host apparatus completely conforms to the packet transfer method, and the corresponding processing is executed. In this case, the header having 6 bytes and the command packet for IEEE1284.4 control, which will be discussed later, are not transferred to the subsequent process (step S203).

If it is determined in step S202 that the leading 6 to 10-odd bytes of the header of the received data are not based on the packet transfer method, the entire received data is delivered to the subsequent process (step S203). In this case, it is recognized that the first transfer method is still used, and the above-described processing in step S406 is canceled, i.e., the resetting of the number of bytes of the received data and the setting of the flag are restored as they were before step S406. The subsequent processing continues according to the restored settings, for example, the analysis of the header according to the packet transfer method is not conducted. Even in this state, however, it is possible to change the transfer method again if there is a device ID request from the host apparatus.

Analysis of Transfer Data

Figure 35:
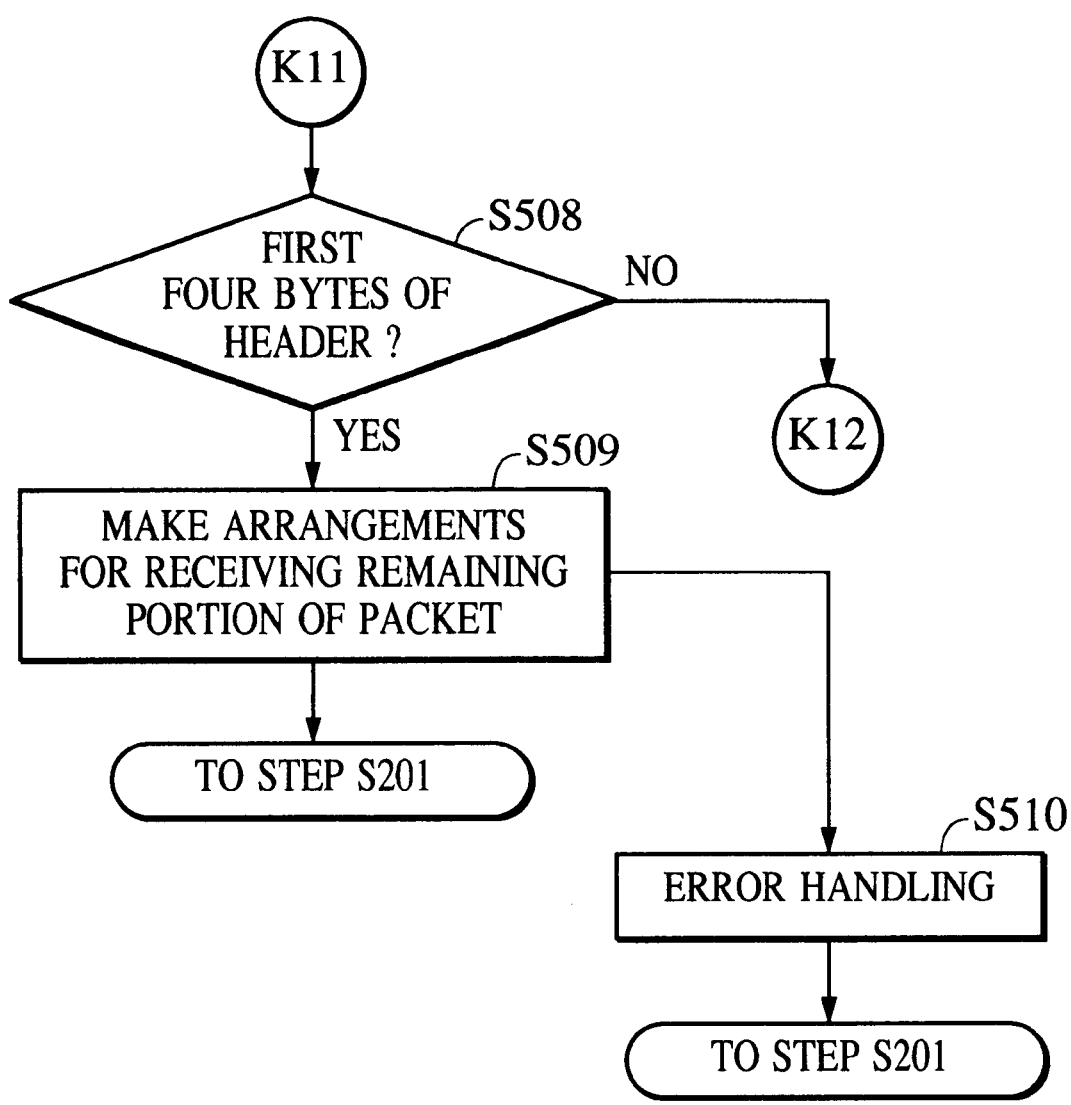
Figure 36:
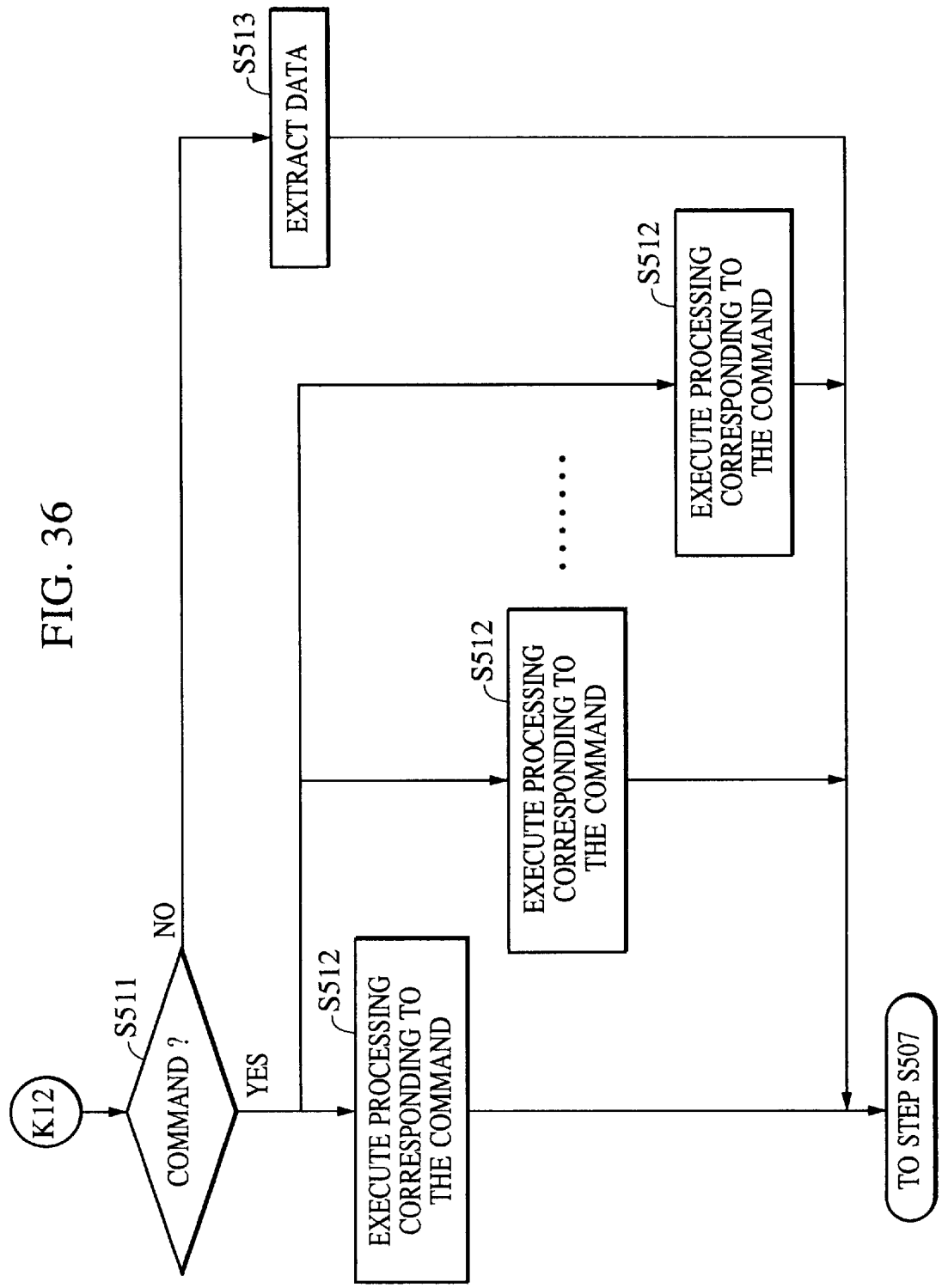

In the operation performed in step S202 of FIG. 29, a detailed description is given below, with reference to FIGS. 34, 35 and 36, of the analysis of the received data conducted when the second transfer method, i.e., the packet transfer method, is based on IEEE1284.4.

Figure 34:
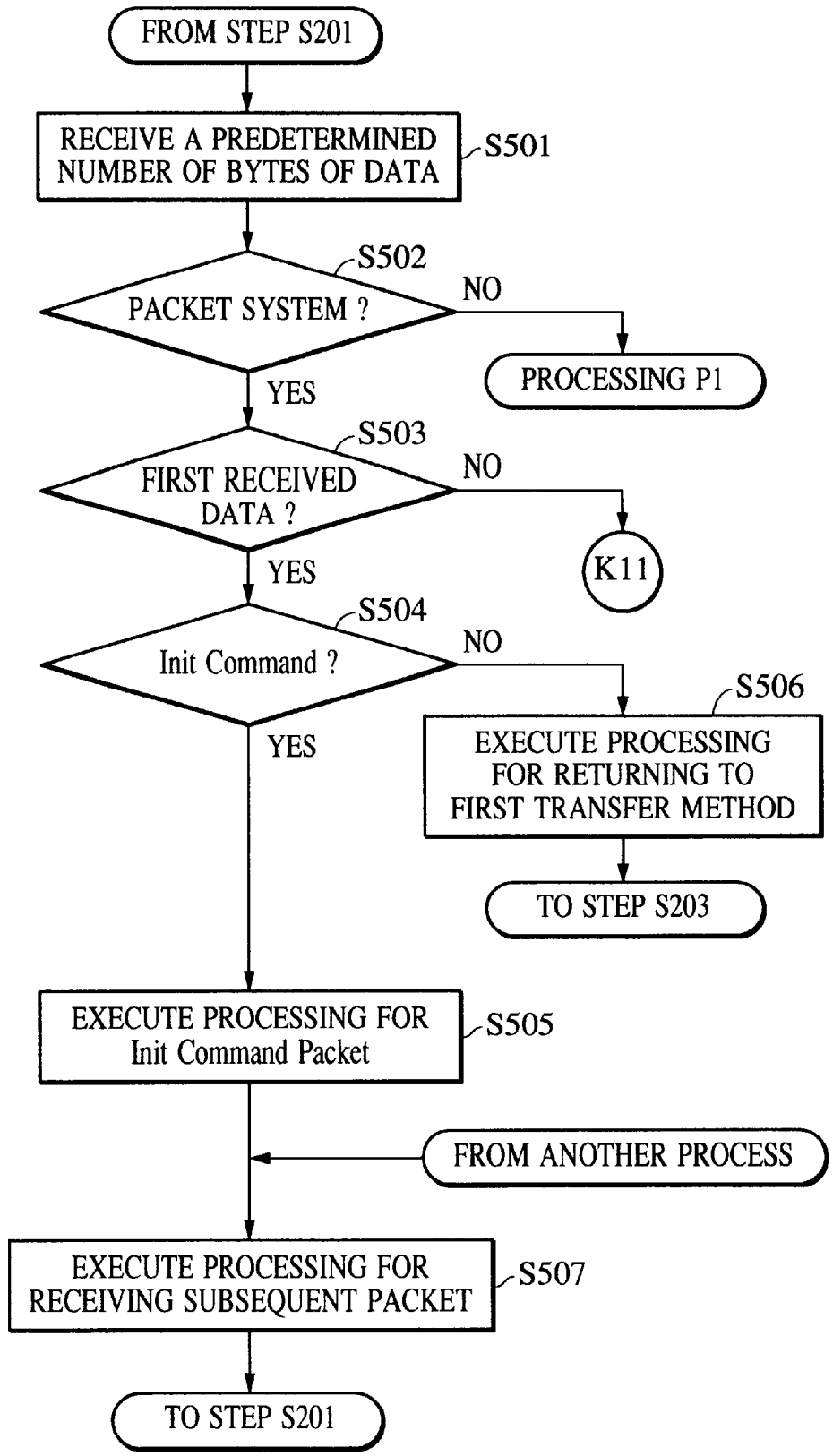
FIGS. 34, 35 and 36 are flow charts illustrating an analysis of transfer data when the control of IEEE1284.4 is used in the present invention.

Reference is first made to FIG. 34. As discussed above, the device ID data is transferred from the printing apparatus in response to the device ID request from the host apparatus. The data received immediately after the device ID data has been transferred is not delivered to the process in step S202 until 6 to 10-odd bytes of data are pooled in step S501. According to IEEE1284.4, which serves as the second transfer method, the number of bytes to be received is set to be eight bytes, in other words, the process in step S501 waits for eight bytes of data to be pooled, and the data is then transferred to step S202.

Then, the flag set in step S406 is analyzed in step S502. If the state of the flag indicates a packet transfer method, the process proceeds to step S503. If not, the received data (the data delivered to step S501) is completely transferred to step S203. It is determined in step S503 whether the data is the first data received after the device ID data has been transferred to the host apparatus. This determination is also made by using the flag set in step S406 (different from the flag set in step S502).

If the outcome of step S503 is yes, the process proceeds to step S504 in which a determination is made of whether the 8-byte data is formed of a header and a data portion followed by the header in a packet based on IEEE1284.4, and a determination is also made of whether the packet is the init command packet shown in FIG. 18. The reason for making this determination is because the first transfer method must have been employed before step S504, and it is thus necessary for the host apparatus to send the init command packet first in order to start the control of IEEE1284.4.

According to the init command packet shown in FIG. 18, the first to the eighth bytes of the structure are nearly fixed, such as 0x00, 0x00, 0x00, 0x08, 0xXX (undefined), 0x00, 0x00, and 0x10, except for the credit parameter (the fifth byte). The above data is clearly recognized as being completely different from the print (control) data transferred according to the first transfer method. (The data which is formed into a packet and the data which is not formed into a packet are shown in FIGS. 9A and 9B, respectively.)

If it is found in step S504 that the packet is the init command packet, the process proceeds to step S505 in which the processing required for the init command packet is executed (the processing of IEEE1284.4 has been discussed). If the result of step S504 is no, the process proceeds to step S506 in which the flag (used in step S502) is set to indicate that the data to be subsequently received is based on the first transfer method, i.e., a determination of whether the data is based on the packet transfer method is no longer required, and the received data is wholly transferred to step S203. The number of bytes of data to be transferred to step S501 is also changed to a suitable value.

The process further proceeds to step S507 in which the processing required for receiving a subsequent packet is executed. Since the init command packet has already been received, the process proceeds to step S501 after receiving four bytes of the header, and then, the flag (which determines whether the data is the first data received after the device ID data has been transferred to the host apparatus) used in step S503 is changed so that the process proceeds directly to step S508 from step S503. Thereafter, the process returns to step S201 in which the process waits for the data to be received.

A description is now given of the processing executed after the data transfer method has been changed to the data packet transfer method under the control of IEEE1284.4 (i.e., the second transfer method) by executing the above-described processing up to step S507 shown in FIG. 34.

In step S508, by using the flag, a determination is made of whether the received data is the first four bytes of the header or the remaining portion of the header (the remaining two bytes) and the data portion. The flag has been set in step S507 to indicate that the header must have been received, i.e., after the init command packet was received. The process then proceeds to step S509 according to the flag. In step S509, the data size to be subsequently received (the value to be set in step S301 in FIG. 30) is determined by referring to the third byte and the fourth byte of the received data representing the parameters of the data size ("Length" in FIG. 8) of the packet.

For example, if the packet represents the open channel command packet shown in FIG. 20, the third byte and the fourth byte should be 0x00 and 0x11, respectively, and thus, the data size to be subsequently received is determined to be 13 (0x11−0x04=0x0d (=13)). The value of the flag (the flag checked in step S508) is also set to indicate that the data to be subsequently received represents the remaining two bytes of the header and the data portion. A further determination is made of whether the packet is a command under the control of IEEE1284.4, i.e., whether the packet is the aforementioned open channel command packet or a data packet, by referring to the first byte and the second byte of the data to be received, i.e., by checking whether PSID and SSID are 0x00 and 0x00, respectively. Based on this determination, the flag to be used in step S511 is set. When both PSID and SSID are 0x00, the packet is the open channel command packet under the control of IEEE1284.4.

The process then returns to step S201 in which the data is received. If it is found in step S509 that the first four bytes of the header include an abnormal value, the process proceeds to step S510 in which error handling is performed according to the type of error. After the first four bytes of the header have been received, the data received from step S201 is transferred to step S511 according to the value of the flag in step S508.

It is determined in step S511 according to the flag set in step S509 whether the received data is a command for executing the control of IEEE1284.4. If the outcome of step S511 is yes, the process proceeds to step S512 in which the processing corresponding to the command is executed. It is possible to check which type of command by checking the third byte of the received data (the seventh byte of the entire packet), i.e., the command parameter (FIG. 20). Additionally, the leading first byte (the fifth byte of the packet) represents the credit, and the second byte (the sixth byte of the packet) indicates the control parameter, as shown in FIG. 8. Thereafter, the process returns to step S507 in which the processing required for receiving a subsequent packet is executed.

If it is found in step S511 that the received data is a data packet, the process proceeds to step S513 in which only the data portion is extracted from the received data and is delivered to the subsequent step S203. The leading two bytes of the received data, which represent the credit parameter and the control parameter, as noted above, are no longer required in step S203 and the subsequent steps. Various settings are then performed for the packet in a manner similar to the settings performed in step S507 for the above-described command so that subsequent data can be received from the head of a packet.

According to the foregoing description, upon receiving a device ID request from the host apparatus, the printing apparatus is able to determine whether data to be subsequently received is based on the packet transfer method. Accordingly, the host apparatus first checks the device ID data transferred from the printing apparatus in the reverse transfer mode to determine whether the aforementioned specific character string, such as the one shown in FIG. 33, is contained in the device ID data. If the specific character string is contained, the host apparatus starts to employ the packet transfer method to transfer the print (control) data to the printing apparatus after receiving the device ID data.

According to the first embodiment, upon detecting that a specific state has passed, the host apparatus or the printing apparatus predicts a change of the transfer method when (or immediately after) the specific state has passed, and an analysis is conducted to determine whether the transfer method has been actually changed for the data to be sequentially transferred from the host apparatus or the printing apparatus. If it is found that the transfer method has been changed used in the host apparatus or the printing apparatus, the other apparatus also switches the transfer method. If, on the other hand, the transfer method has not been changed in the host apparatus or the printing apparatus, the other apparatus maintains the same transfer method. This enables the simplicity of the processing for monitoring the change of the transfer methods, thereby enhancing the efficiency of the entire printing operation.

Modifications of the first embodiment may be, for example, as follows.

(1) In the first embodiment, in response to the device ID request made from the host apparatus, the printing apparatus has transferred the device ID data provided with a specific character string in the reverse transfer mode. Upon receiving the above device ID data, the host apparatus changes the transfer method to the packet transfer method (at this time, the printing apparatus has already executed the required processing to allow for a change in the transfer method). Alternatively, the transfer method may be changed immediately after the device ID data has been transferred in the reverse transfer mode without changing the transfer method immediately after transferring the device ID request or determining whether the printing apparatus has added a specific character string to the device ID data. In this modification, advantages similar to those obtained in the first embodiment can be offered.

(2) In the first embodiment and the above-described modification (1), instead of making the device ID request defined in IEEE1284-1994, the printing apparatus may be initialized by using an initializing signal (generally referred to as an "input prime" or an "init signal") on a parallel interface (for example, the Centronics interface) or using a switch of the operation unit 1012. Immediately after this initialization, the host apparatus may change the transfer method for print (control) data, and the printing apparatus may execute the required processing in accordance with a change in the transfer method. In this modification, advantages obtained in the first embodiment and the modification (1) can be offered.

(3) Instead of the device ID request made by the host apparatus in the first embodiment, an instruction may be provided through a switch of the operation unit 1012. The printing apparatus may execute the required processing to handle a change in the transfer method. In this modification, advantages similar to those obtained in the first embodiment can be offered.

(4) In the first embodiment, the transfer method may be changed to the packet transfer method when power is supplied to initialize the printing apparatus (step S200 of FIG. 29), and the printing apparatus may execute the required processing to allow for this change. In this modification, advantages similar to those obtained in the first embodiment can be offered.

(5) Although in the first embodiment the device ID request is made from the host apparatus, a specific command (control data) may be provided to change the transfer method for print (control) data. In response to the command, the printing apparatus executes the required processing to allow for a change in the transfer method. In this modification, advantages similar to those obtained in the first embodiment can be offered.

(6) In the first embodiment and the above-described modifications (1) through (5), when the required processing for changing the transfer methods is completed, the printing apparatus (or the host apparatus) waits for a certain amount of data to be received. In this case, if the amount of data transferred from the host apparatus (or the printing apparatus) is insufficient, for example, the specified bytes of data are not received in step S301 of FIG. 30, i.e., a determination of whether the transfer method has been changed cannot be made even after a lapse of a predetermined period, the changing of the transfer method may be abandoned. In this modification, advantages similar to those obtained in the first embodiment and the above modifications (1) through (5) can be offered.

(7) The period for making a determination of whether the transfer method has been changed in the above modification (6) may be instructed by the operation unit 1012 or a command provided from the host apparatus. In this modification, advantages similar to those obtained in the first embodiment can be offered.

Second Embodiment

In the first embodiment, after transferring the device ID data from the printing apparatus to the host apparatus, an analysis is conducted to determine whether the second transfer method (packet transfer method) is employed for transferring data from the host apparatus. If it is found that the transferred data is not based on the packet transfer method (for example, if the data is not an init command packet based on IEEE1284.4), the use of the packet transfer method is abandoned, and the first transfer method is utilized for transferring the data. In this case, the aforementioned analysis may continue until the amount (bytes) of data reaches a predetermined number of bytes. In this modification, advantages similar to those offered by the first embodiment can be obtained.

Figure 37:
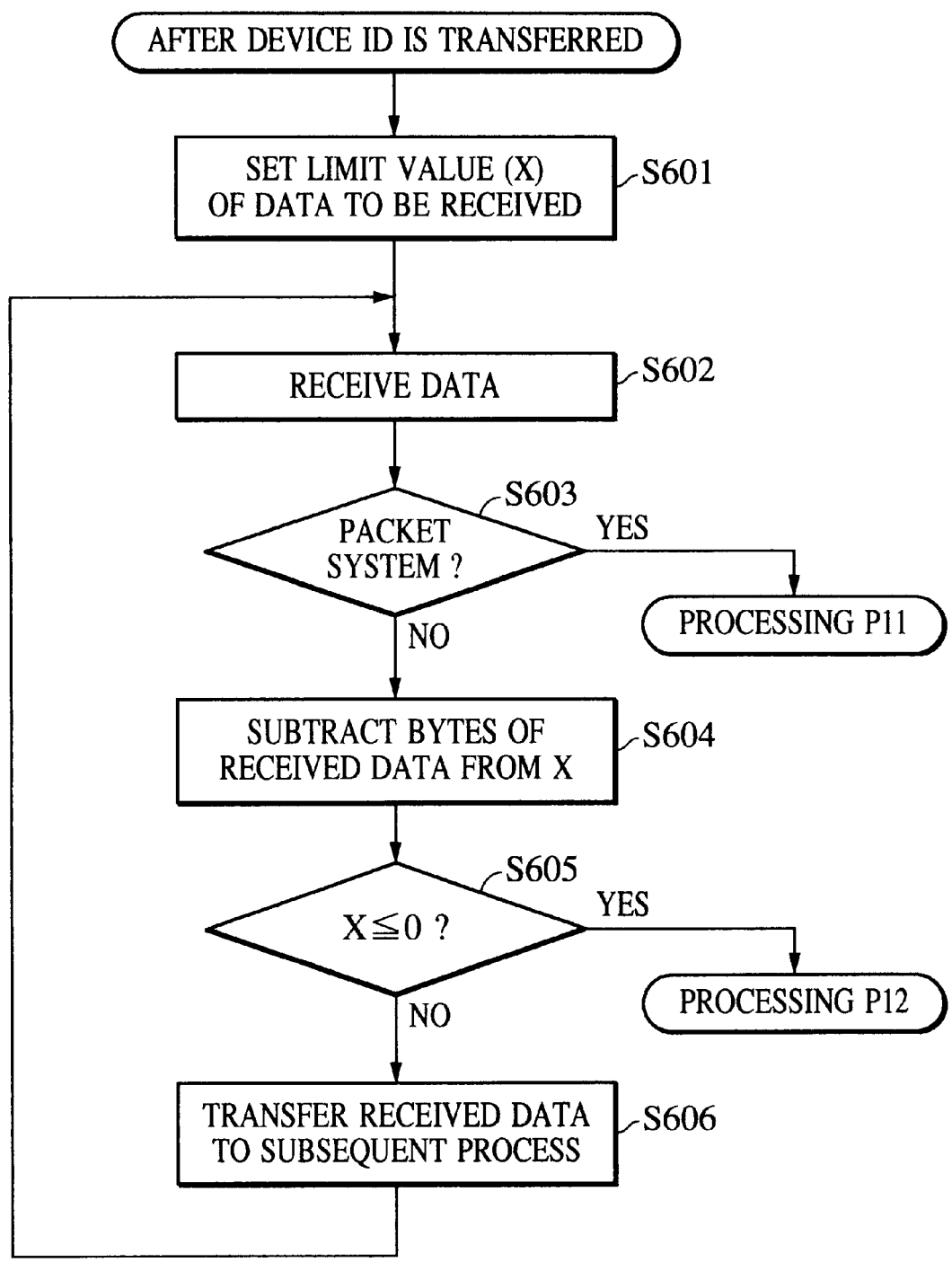
FIG. 37 is a flow chart illustrating the control flow according to a second embodiment of the present invention.

The control by such a modification (a second embodiment) is described below with reference to the flow chart of FIG. 37.

After the printing apparatus has transferred the device ID data, the amount (bytes) of data (X) to be analyzed for determining whether the data is based on the packet transfer method is set in step S601. A plurality of bytes of data transferred from the host apparatus is received in step S602. In this case, the method employed in the first embodiment may be used to receive the data, or another method may be employed.

Then, an analysis is conducted to determine in step S603 whether the received data is based on the packet transfer method. If the result of step S603 is yes, the processing continues according to the packet transfer method (for example, the control method based on IEEE1284.4), i.e., the flow proceeds to processing P11. If the outcome of step S603 is no, the process proceeds to step S604 in which the received bytes of data are subtracted from the bytes of data (X) set in step S601.

A determination is then made in step S605 of whether the calculated value X is equal to or smaller than zero. If the outcome of step S605 is yes, it is determined that from among the predetermined bytes of data (X) received so far, there is no data based on the packet transfer method. Thereafter, the processing continues in accordance with the first transfer method (processing P12). The data received in step S602 is completely transferred to the subsequent process (for example, step S203 of FIG. 29 of the first embodiment).

If it is found in step S605 that the calculated value X is greater than zero, an analysis for determining whether the received data is based on the packet transfer method still continues. Thus, flow advances to step S606 where the received data is transferred to a subsequent process. After the received data is transferred to the subsequent process (for example, step S203 of FIG. 29 of the first embodiment), the process returns to step S602 in which the data transferred from the host apparatus is received.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing system comprising a printing apparatus and a host apparatus of said printing apparatus, in which print data or control data is transferred between said printing apparatus and said host apparatus in accordance with one of at least two transfer methods, said printing system comprising:

prediction means for predicting a change of the transfer method, and whereupon a transfer, from said printing apparatus to said host apparatus, of data indicating that a predetermined transfer method is executable, said prediction means checks whether or not use of the predetermined transfer method has begun; and control means for controlling said printing apparatus to change into the predetermined transfer method in response to a command which indicates use of the predetermined transfer method.

2. A printing apparatus for receiving print data or control data from a host apparatus in accordance with one of at least two transfer methods, said printing apparatus comprising:

prediction means for predicting a change in transfer method, whereupon transfer of data to the host apparatus indicating that a predetermined transfer method is executable, said prediction means checks to determine whether or not use of the predetermined transfer method has begun; and control means for controlling said printing apparatus to change into the predetermined transfer method in accordance with the determination.

3. A printing apparatus according to claim 2, wherein in response to receiving a request for device identification from the host apparatus and transferring data in response to the request, said prediction means commences checking to determine whether or not use of the predetermined transfer method has begun and causes the printing apparatus to be on notice for a potential change of the transfer method.

4. A printing apparatus according to claim 3, wherein the request is defined in IEEE 1284 and the predetermined transfer method is a transfer method defined IEEE1284.4.

5. A printing apparatus according to claim 2, wherein to check whether or not the predetermined transfer method has started, said prediction means waits until a predetermined amount of data has been received and analyzes the predetermined amount of data.

6. A printing apparatus according to claim 5, wherein the predetermined amount of data comprises an instruction from an operation unit or a command received from the host computer.

7. A printing apparatus according to claim 5, wherein the predetermined transfer method is a packet transfer method and said prediction means analyzes the predetermined amount of data to check whether or not use of the packet transfer method has begun.

8. A method of controlling a change in transfer method between two apparatuses, said method comprising the steps of:

initiating, upon transfer of data indicating that a predetermined transfer method is executable, a check to determine whether or not use of the predetermined transfer method has begun; and controlling at least one of two apparatuses to change into the predetermined transfer method in accordance with the determination.

9. A method according to claim 8, whereupon receiving a request for device identification and transferring data in response to the request, at least one of two apparatuses initiates a check to determine whether or not use of the predetermined transfer method has begun, and wherein the at least one of two apparatuses becomes ready to change to the transfer method.

10. A method according to claim 9, wherein the request is defined in IEEE1284 and the predetermined transfer method is a transfer method defined in IEEE1284.4.

11. A method according to claim 8, further comprising the steps of waiting for receipt of a predetermined amount of data, and analyzing the predetermined amount of data to determine whether or not use of the predetermined transfer method has begun.

12. A method according to claim 11, wherein the predetermined amount of data comprises an instruction from an operation unit or a command from another apparatus.

13. A method according to claim 11, wherein the predetermined transfer method is a packet transfer method and said analyzing step analyzes the predetermined amount of data to determine whether or not use of the packet transfer method has begun.

* * * * *